United States Patent
Teyeb et al.

(10) Patent No.: US 12,375,979 B2
(45) Date of Patent: Jul. 29, 2025

(54) IMPLICIT INDICATION OF CENTRALIZED UNIT (CU) INTEGRATED ACCESS BACKHAUL (IAB) CAPABILITY

(71) Applicant: Telefonaktiebolaget LM Ericsson (publ), Stockholm (SE)

(72) Inventors: Oumer Teyeb, Montréal (CA); Filip Barac, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 17/617,389

(22) PCT Filed: May 28, 2020

(86) PCT No.: PCT/SE2020/050540
§ 371 (c)(1),
(2) Date: Dec. 8, 2021

(87) PCT Pub. No.: WO2021/025604
PCT Pub. Date: Feb. 11, 2021

(65) Prior Publication Data
US 2022/0264383 A1    Aug. 18, 2022

Related U.S. Application Data

(60) Provisional application No. 62/883,271, filed on Aug. 6, 2019.

(51) Int. Cl.
*H04W 36/02* (2009.01)
*H04W 36/00* (2009.01)
*H04W 36/12* (2009.01)

(52) U.S. Cl.
CPC ... *H04W 36/0058* (2018.08); *H04W 36/0061* (2013.01); *H04W 36/12* (2013.01)

(58) Field of Classification Search
USPC ........................................................ 370/331
See application file for complete search history.

(56) References Cited

U.S. PATENT DOCUMENTS 11,792,825 B2 * 10/2023 Abedini ............... H04L 5/0094
370/329
2013/0210429 A1   8/2013 Aoyagi et al.
(Continued)

OTHER PUBLICATIONS

ETSI TS 136.331 V8.18.0 (Feb. 2013) (Year: 2013).*
(Continued)

*Primary Examiner* — Gregory B Sefcheck
*Assistant Examiner* — Majid Esmaeilian
(74) *Attorney, Agent, or Firm* — Murphy, Bilak & Homiller, PLLC

(57) ABSTRACT

Embodiments include methods, performed by a mobile terminal (MT) of an integrated access backhaul (IAB) node in a radio access network (RAN), for reporting capabilities of cells in the RAN. Such methods include detecting one or more cells in the RAN and determining whether the one or more cells support IAB (e.g., by receiving information broadcast by the respective cells). Such methods also include sending, to a centralized unit (CU, e.g., of a base station) in the RAN, a measurement report including an indication of whether the one or more cells support IAB. Various techniques can be used to indicated IAB support. In some embodiments, the MT can receive a reconfiguration message, from the CU, for a handover to one of the cells that supports IAB. Other embodiments include complementary methods performed by CUs, as well as MTs and CUs configured to perform such methods.

13 Claims, 18 Drawing Sheets

(56) References Cited

U.S. PATENT DOCUMENTS

| | | | |
|---|---|---|---|
| 2019/0116605 A1* | 4/2019 | Luo | H04W 72/0446 |
| 2020/0221521 A1* | 7/2020 | Cui | H04W 76/15 |
| 2020/0383016 A1* | 12/2020 | Chen | H04W 48/16 |
| 2021/0014782 A1* | 1/2021 | Cui | H04W 48/20 |
| 2021/0075496 A1* | 3/2021 | Mildh | H04W 40/22 |
| 2021/0227435 A1* | 7/2021 | Hsieh | H04W 36/087 |
| 2021/0259051 A1* | 8/2021 | Latheef | H04W 24/02 |
| 2021/0321281 A1* | 10/2021 | Wei | H04W 24/10 |
| 2021/0345211 A1* | 11/2021 | Keskitalo | H04W 36/00725 |
| 2022/0007275 A1* | 1/2022 | Li | H04W 72/21 |
| 2022/0039189 A1* | 2/2022 | Wu | H04W 36/00 |
| 2022/0061010 A1* | 2/2022 | Harada | H04W 48/16 |
| 2022/0141732 A1* | 5/2022 | Wu | H04W 36/0077 370/331 |
| 2022/0264321 A1* | 8/2022 | Huang | H04B 7/0695 |

OTHER PUBLICATIONS

ETSI TS 138.331 V15.3.0 (Oct. 2018) (Year: 2018).*
"3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, pp. 1-32.
"3GPP TS 38.213 V15.6.0", 3rd Generation Partnership Project; Technical Specification Group Radio Access Network; NR; Physical layer procedures for control (Release 15), Jun. 2019, pp. 1-107.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.423 V15.4.0", 3rd Generation Partnership Project; Technical Specification Group Radio Access Network; NG-RAN; Xn application protocol (XnAP) (Release 15), Jul. 2019, pp. 1-309.
"3GPP TS 38.425 V15.6.0", 3rd Generation Partnership Project; Technical Specification Group Radio Access Network; NG-RAN; NR user plane protocol (Release 15), Jul. 2019, pp. 1-22.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"3GPP TS 38.473 V15.6.0", 3rd Generation Partnership Project; Technical Specification Group Radio Access Network; NG-RAN; F1 application protocol (F1AP) (Release 15), Jul. 2019, pp. 1-220.
"3GPP TS 36.300 V15.5.0", 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 15), Mar. 2019, pp. 1-363.
"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.
"IAB Integration", 3GPP TSG-WG3 Meeting #103bis; R3-191387; Xi'an, China, Apr. 8-12, 2019, pp. 1-6.
"Intra IAB donor-CU topology adaptation procedure", 3GPP TSG-RAN WG3 Meeting #103bis; R3-191852; Xi'an, China, Apr. 8-12, 2019, pp. 1-3.
"Topology Adaptation Scenarios", 3GPP TSG-RAN WG3#101; R3-185152; Gothenburg, Sweden, Aug. 20-24, 2018, pp. 1-6.
"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"ETSI TS 138 300 V15.6.0", 5G; NR; Overall description; Stage-2 (3GPP TS 38.300 version 15.6.0 Release 15), Jul. 2019, pp. 1-102.
"New WID: Integrated Access and Backhaul for NR", 3GPP TSG RAN Meeting #82 RP-182882, Sorrento, Italy, Dec. 10-13, 2018, pp. 1-7.

* cited by examiner

Neighbor Cell Relation Table (NCRT)

FIG. 11

```
-- ASN1START
-- TAG-REPORTCONFIGNR-START

ReportConfigNR ::=                  SEQUENCE {
    reportType                          CHOICE {
        periodical                          PeriodicalReportConfig,
        eventTriggered                      EventTriggerConfig,
        ...,
        reportCGI                           ReportCGI,
        reportIABCapability                 ReportIABCapability
    }
}

...

ReportIABCapability ::=             SEQUENCE {
    cellsForWhichToReportIABCapability SEQUENCE (SIZE (1..maxReportIABCapability))OF PhysCellId,
    ...
}
```

FIG. 12

```
MeasConfig ::=                      SEQUENCE {
    measObjectToRemoveList              MeasObjectToRemoveList              OPTIONAL,    -- Need N
    measObjectToAddModList              MeasObjectToAddModList              OPTIONAL,    -- Need N
    reportConfigToRemoveList            ReportConfigToRemoveList            OPTIONAL,    -- Need N
    reportConfigToAddModList            ReportConfigToAddModList            OPTIONAL,    -- Need N
    measIdToRemoveList                  MeasIdToRemoveList                  OPTIONAL,    -- Need N
    measIdToAddModList                  MeasIdToAddModList                  OPTIONAL,    -- Need N
    s-MeasureConfig                     CHOICE {
        ssb-RSRP                            RSRP-Range,
        csi-RSRP                            RSRP-Range
    }                                                                       OPTIONAL,    -- Need M
    quantityConfig                      QuantityConfig                      OPTIONAL,    -- Need M
    measGapConfig                       MeasGapConfig                       OPTIONAL,    -- Need M
    measGapSharingConfig                MeasGapSharingConfig                OPTIONAL,    -- Need M
    ...,
    reportIABCapability                 ENUMERATED {true} OPTIONAL                       OPTIONAL
}

MeasObjectToRemoveList ::=          SEQUENCE (SIZE (1..maxNrofObjectId))  OF MeasObjectId
MeasIdToRemoveList ::=              SEQUENCE (SIZE (1..maxNrofMeasId))    OF MeasId
ReportConfigToRemoveList ::=        SEQUENCE (SIZE (1..maxReportConfigId)) OF ReportConfigId
```

IMPLICIT INDICATION OF CENTRALIZED UNIT (CU) INTEGRATED ACCESS BACKHAUL (IAB) CAPABILITY

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0)) shall be applied.

The NG RAN logical nodes shown in FIG. 1 (and described in 3GPP TS 38.401 (v15.6.0) and 3GPP TR 38.801 (v14.0.0)) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Furthermore, the F1 interface between the gNB-CU and gNB-DU is specified and/or based on the following general principles:

F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane and user plane separation into respective F1-AP protocol and F1-U protocol (also referred to as NR User Plane Protocol), such that a gNB-CU may also be separated in CP and UP;
F1 separates Radio Network Layer (RNL) and Transport Network Layer (TNL);
F1 enables exchange of user equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1-AP protocol that is defined in 3GPP TS 38.473 (v15.6.0).

In addition, the F1-U protocol is used to convey control information related to the user data flow management of data radio bearers, as defined in 3GPP TS 38.425 (v15.6.0). The F1-U protocol data is conveyed by the GTP-U protocol, more specifically by the "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU ican host RRC and PDCP, where PDCP is assumed to handle both UP traffic and CP traffic. Other arrangements of hosting certain protocols in the CU and certain others in the DU are also possible.

Furthermore, centralized control plane protocols (e.g., PDCP-C and RRC) can be hosted in a different CU than centralized user plane protocols (e.g., PDCP-U). In particular, it has also been agreed in 3GPP RAN3 Working Group (WG) to support a separation of the gNB-CU into a CU-CP function (including RRC and PDCP for signaling radio bearers) and CU-UP function (including PDCP for user plane). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. Three deployment scenarios for the split gNB architecture shown in FIG. 2 are defined in 3GPP TR 38.806 (v15.0.0):

Scenario 1: CU-CP and CU-UP centralized;
Scenario 2: CU-CP distributed and CU-UP centralized;
Scenario 3: CU-CP centralized and CU-UP distributed.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative.

One such approach is an integrated access backhaul (IAB) network where the operator can repurpose radio resources conventionally used for network access (e.g., by wireless devices or UEs) for use to connect small cells to the operator's backhaul network. IAB was studied earlier in 3GPP in the scope of Long Term Evolution (LTE) Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

Similar IAB options can also be considered for 5G/NR networks. One difference compared to LTE is the gNB-CU/DU split architecture described above, which separates time critical RLC/MAC/PHY protocols from less time critical RRC/PDCP protocols. It is anticipated that a similar split could also be applied for the IAB case. Other IAB-related differences in NR as compared to LTE are support of multiple hops and support of redundant paths. These and other IAB-related issues can create various problems and/or difficulties for deployment and/or management of IAB nodes in 5G/NR networks.

SUMMARY

Accordingly, exemplary embodiments of the present disclosure address these and other difficulties in integrating IAB nodes into a RAN, thereby enabling the otherwise-advantageous deployment of IAB solutions.

Exemplary embodiments of the present disclosure include methods (e.g., procedures) for reporting integrated access backhaul (IAB) capabilities of cells in a radio access network (RAN). These exemplary methods can be performed by a mobile terminal (MT) of an IAB node in the RAN (e.g., NG-RAN).

These exemplary methods can include detecting one or more cells in the RAN, and determining whether the one or more cells support IAB. These exemplary methods can also include sending, to a centralized unit (CU, e.g., an IAB-donor CU of a gNB) in the RAN, a measurement report including an indication of whether the one or more cells support IAB.

In some embodiments, the indication for each particular cell of the one or more cells can take on a first value (e.g., "1" or "true") in a first field of the measurement report if the particular cell supports IAB, and a second value (e.g., "0" or "false") in the first field if the particular cell does not support IAB. In other embodiments, the indication for each particular cell of the one or more cells can be a first field in the measurement report if the particular cell supports IAB, but can be absence of the first field from the measurement report if the particular cell does not support IAB.

In other embodiments, these exemplary methods can also include receiving, from the CU, a measurement configuration including a first parameter indicating that the MT should report measurements only for cells that support IAB. In such embodiments, the indication for each particular cell of the one or more cells includes one or more measurements for the particular cell, if the particular cell supports IAB; and no measurements for the particular cell, if the particular cell does not support IAB.

In some embodiments, these exemplary methods can also include receiving, from the CU, a measurement configuration including a second parameter that enables or disables determining IAB support for at least the one or more cells. In such embodiments, determining IAB support can be performed conditionally based on the second parameter.

In some embodiments, these exemplary methods can also include sending, to the CU, a first measurement report including respective physical cell identity (PCIS) corresponding to the one or more cells. In some of these embodiments, the "first measurement report" can be the same as "measurement report" discussed above, such that the MT can send the first measurement report that includes the indications of whether the one or more cells support IAB and the PCIS corresponding to the one or more cells.

In other of these embodiments, the first measurement report may not include the IAB support indications. In such embodiments, these exemplary methods can also include receiving, from the CU in response to the first measurement report, a request for an indication of whether the one or more cells support IAB. In such embodiments, the MT can send, to the CU responsive to the request, a second measurement report that includes the indications of whether the one or more cells support IAB. Put differently, in these embodiments, the second measurement report is the same as the "measurement report." Furthermore, in some of these embodiments, the second measurement report can include cell global identities (CGI) corresponding to the one or more cells.

In some embodiments, determining whether the one or more cells support IAB can include receiving system information (SI) broadcast by the one or more cells, where the broadcast SI includes respective indications of whether the one or more cells support IAB.

In some embodiments, these exemplary methods can also include receiving, from the CU, a reconfiguration message for initiating handover of the MT to a first cell, of the one or more cells, that supports IAB. For example, based on MT reporting of the IAB support, the CU can select a particular one of the cells that supports IAB for handover of the MT.

Other embodiments include additional methods (e.g., procedures) for determining integrated access backhaul (IAB) capabilities of cells in a radio access network (RAN). These exemplary methods can be performed by a centralized unit (CU, e.g., IAB-donor CU of a gNB) in the RAN (e.g., NG-RAN).

These exemplary methods can include receiving, from a radio node in the RAN, a message that includes indications of whether one or more cells in the RAN support integrated access backhaul (IAB). In various embodiments, the radio node can be an MT of an IAB node or another CU. These exemplary methods can also include, for each particular cell of the one or more cells, determining whether a neighbour cell relations table (NCRT) maintained by the CU includes an existing entry for the particular cell. These exemplary methods can also include, for each particular cell, performing one of the following operations based on the received indications: updating an existing NCRT entry for the particular, or adding a new NCRT entry for the particular cell. In some embodiments, each existing or new NCRT entry can include a field indicating whether the particular cell supports IAB.

In some embodiments, the indication for each particular cell can take on a first value (e.g., "1" or "true") in a first field of the measurement report if the particular cell supports IAB, and a second value (e.g., "0" or "false") in the first field if the particular cell does not support IAB. In other embodiments, the indication for each particular cell can be a first field in the measurement report if the particular cell supports IAB, or the absence of the first field from the measurement report if the particular cell does not support IAB.

In other embodiments, these exemplary methods can also include sending, to the radio node, a measurement configuration including a first parameter indicating that the radio node should report measurements only for cells that support IAB. In such embodiments, the indication for each particular cell of the one or more cells includes one or more measurements for the particular cell, if the particular cell supports IAB, and no measurements for the particular cell, if the particular cell does not support IAB.

In some embodiments, the node in the RAN can be a mobile terminal (MT) of an IAB node. In such embodiments, these exemplary methods can also include sending, to the radio node (e.g., the MT), a measurement configuration including a second parameter that enables or disables determining IAB support for at least the one or more cells.

In some embodiments, each existing NCRT entry includes a stored physical cell identity (PCI). In such embodiments, these exemplary methods can also include receiving, from the radio node (e.g., an MT), a first measurement report including respective PCIs corresponding to the one to or more cells. In such embodiments, the determining operations can include comparing the corresponding PCI for each particular cell in the first measurement report to one or more of the stored PCIs (i.e., in the NCRT).

In some of these embodiments, the first measurement report can be the same as "message". For example, the CU can receive the first measurement report (which in this case is the "message") that includes the indications of whether the one or more cells support IAB and the PCIs corresponding to the one or more cells.

In other of these embodiments, the first measurement report may not include IAB support indications. In such embodiments, these exemplary methods can also include sending, to the radio node (e.g., the MT), a request for an indication of whether the one or more cells support IAB. This request can be based on determining that the NCRT does not include respective existing entries for the one or more cells. In such embodiments, the CU can receive, from the radio node (e.g., MT) responsive to the request, a second measurement report that includes the indications of whether the one or more cells support IAB. Put differently, in these embodiments, the second measurement report is the same as the "message." Furthermore, in some of these embodiments, the second measurement report can include cell global identities (CGI) corresponding to the one or more cells.

In some embodiments, these exemplary methods can also include, based on the NCRT, selecting a first cell, of the one or more cells, that supports IAB; and sending, to the radio node (e.g., the MT), a reconfiguration message for initiating handover of the node to the first cell. For example, based on the MT's reporting of the IAB support, the CU can select a particular one of the cells that supports IAB for handover of the radio node.

In some embodiments, the radio node can be a second CU (i.e., different from the CU performing the method). In such embodiments, the message can include a single indication of whether all cells associated with the second CU support IAB. Furthermore, in such embodiments, these exemplary methods can also include sending, to the radio node (e.g., the second CU), a further message indicating whether all cells associated with the CU support IAB. In various embodiments, the further message can be sent in response to the message received from the radio node, or sent prior to receiving the message from the radio node (e.g., such that the message is responsive to the further message).

In some embodiments, these exemplary methods can also determining whether the radio node supports IAB based on NCRT entries for cells associated with the radio node and/or the indications in the message from the radio node. In such embodiments, sending the further message can be based on determining that the radio node supports IAB. In some embodiments, the further message can also include resource allocation for one or more distributed units (DUs), associated with the CU.

Other exemplary embodiments include mobile terminals (MTs) of IAB nodes and centralized units (CUs, e.g., of a gNB) configured to perform the operations of any of the exemplary methods described herein. Other exemplary embodiments also include non-transitory, computer-readable media storing computer-executable instructions that, when executed by processing circuitry of such MTs and CUs, configure the same to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIG. 11 shows an ASN.1 data structure corresponding to an exemplary ReportConfigNR IE for radio resource control (RRC), according to various embodiments of the present disclosure.

FIG. 12 shows an ASN.1 data structure corresponding to an exemplary MeasConfig IE for RRC, according to various embodiments of the present disclosure.

FIG. 14, which includes

DETAILED DESCRIPTION

Figure 1:
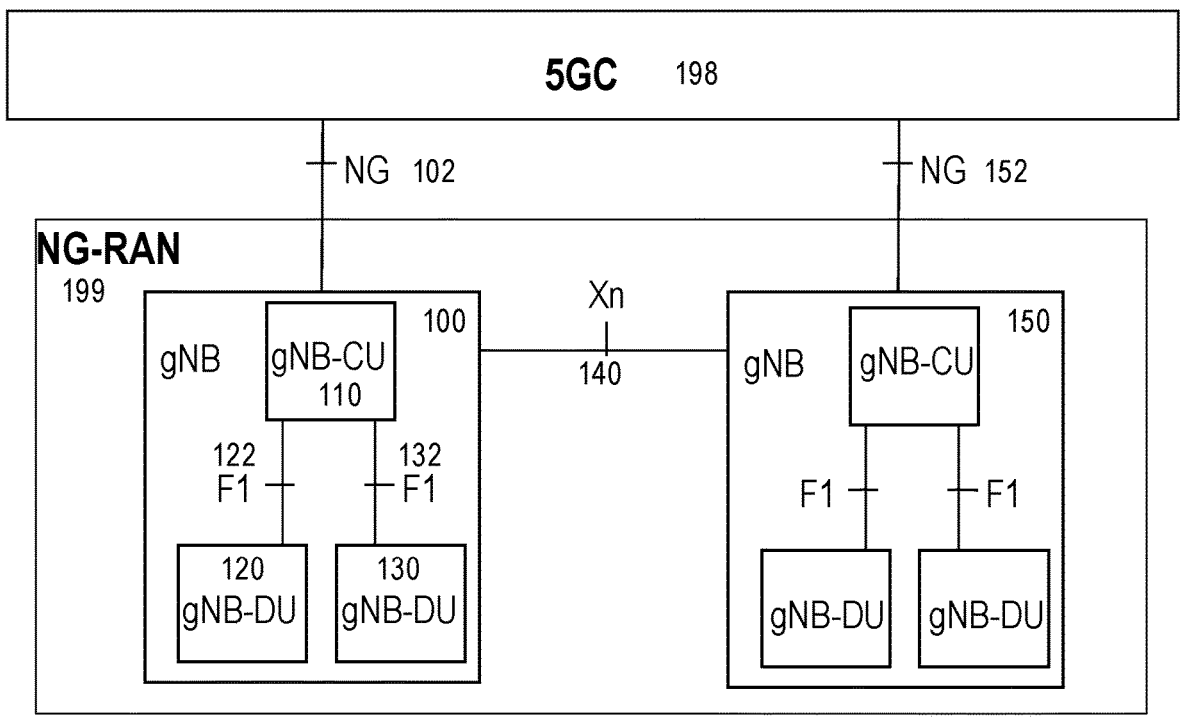
FIG. 1 shows a high-level view of the 5G network architecture, including central unit (CU)-distributed unit (DU) split architecture of gNBs.
Figure 2:
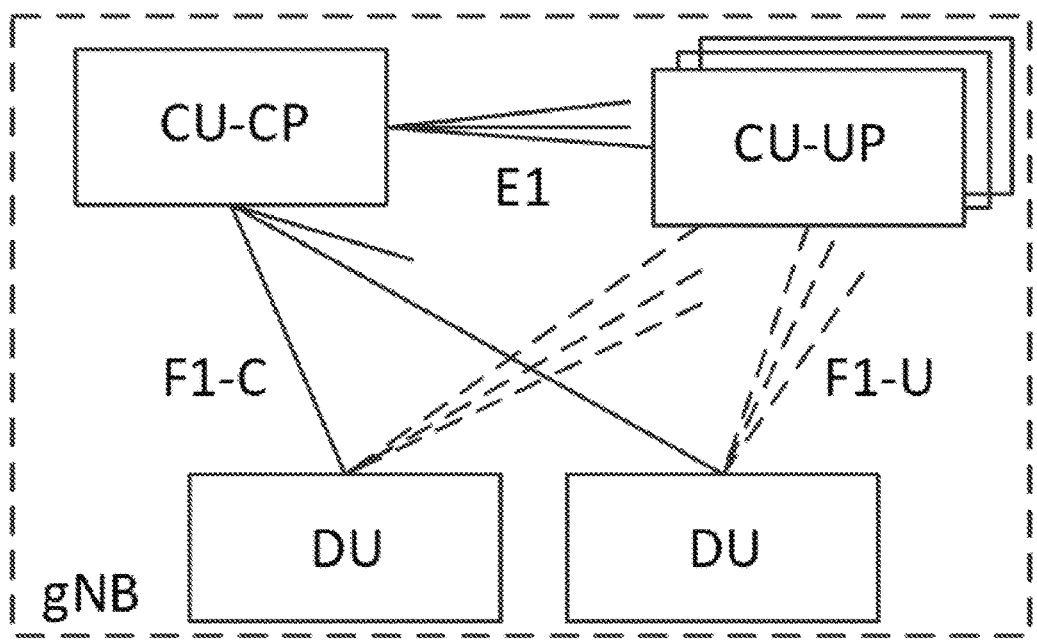
FIG. 2 shows the control-plane (CP) and user-plane (UP) interfaces within the split CU-DU architecture shown in FIG. 1.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, there are various IAB-related issues that can create various problems and/or difficulties for deployment and/or management of IAB nodes in 5G/NR networks. These issues include the split CU/DU architecture, support of multiple hops, and support of redundant paths. For various reasons, it can be beneficial for an IAB-donor CU to be aware of its neighboring IAB-capable nodes and cells. This is discussed in more detail below.

Figure 3:
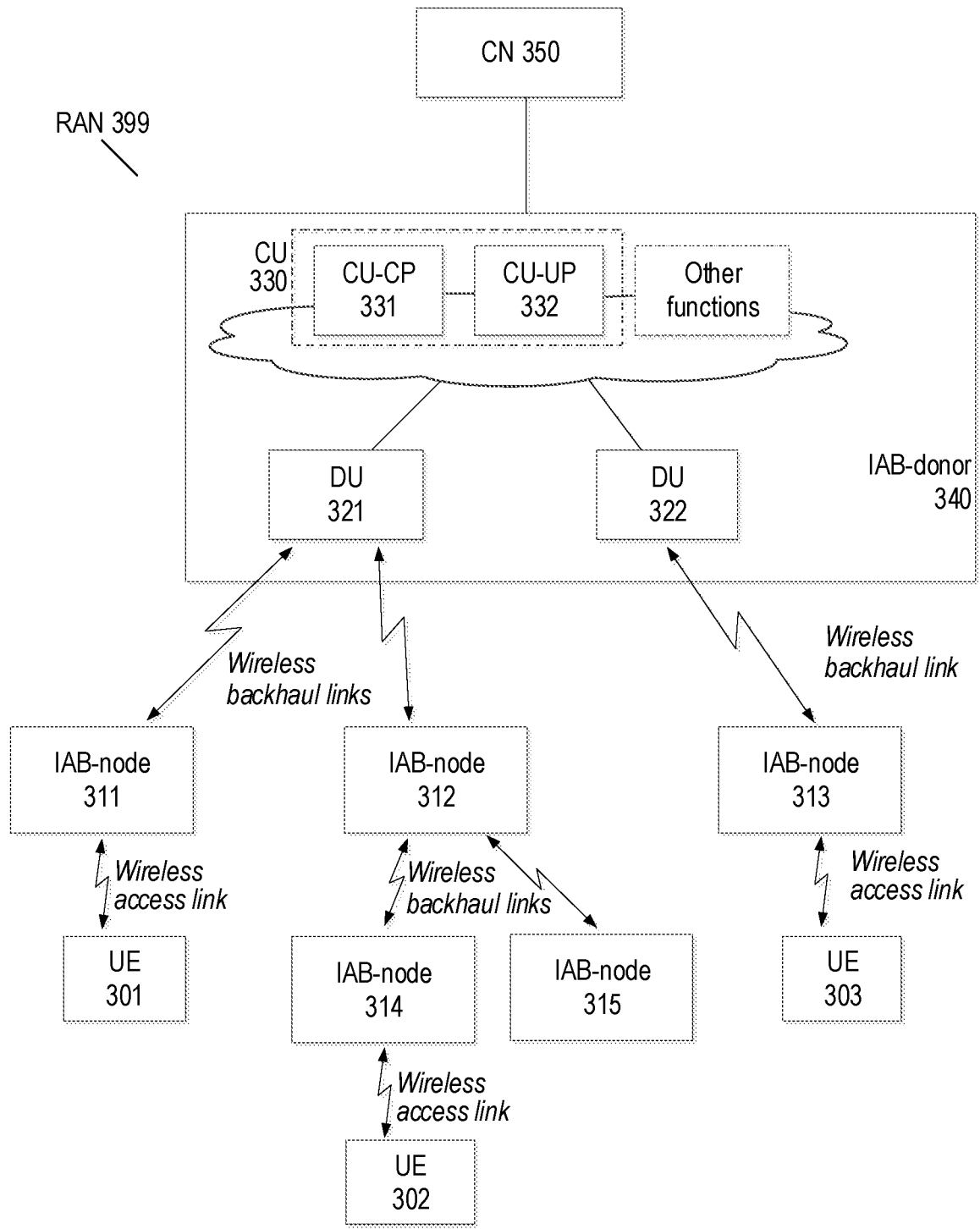
FIG. 3 shows a reference diagram for an integrated access backhaul (IAB) network in standalone mode, as further explained in 3GPP TR 38.874.

FIG. 3 shows a reference diagram for an IAB network in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of a wireless backhaul link towards a corresponding "upstream" (or "northbound") DU function. This MT functionality is similar to functionality that enables UEs to access the IAB network and, in fact, has been specified by 3GPP as part of the Mobile Equipment (ME).

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers of wireless access links towards UEs (e.g., for network access via the DU) and wireless backhaul links towards other downstream IAB nodes.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the 3GPP IAB specifications reuse existing functions and interfaces defined in NR. In particular, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

Figure 4:
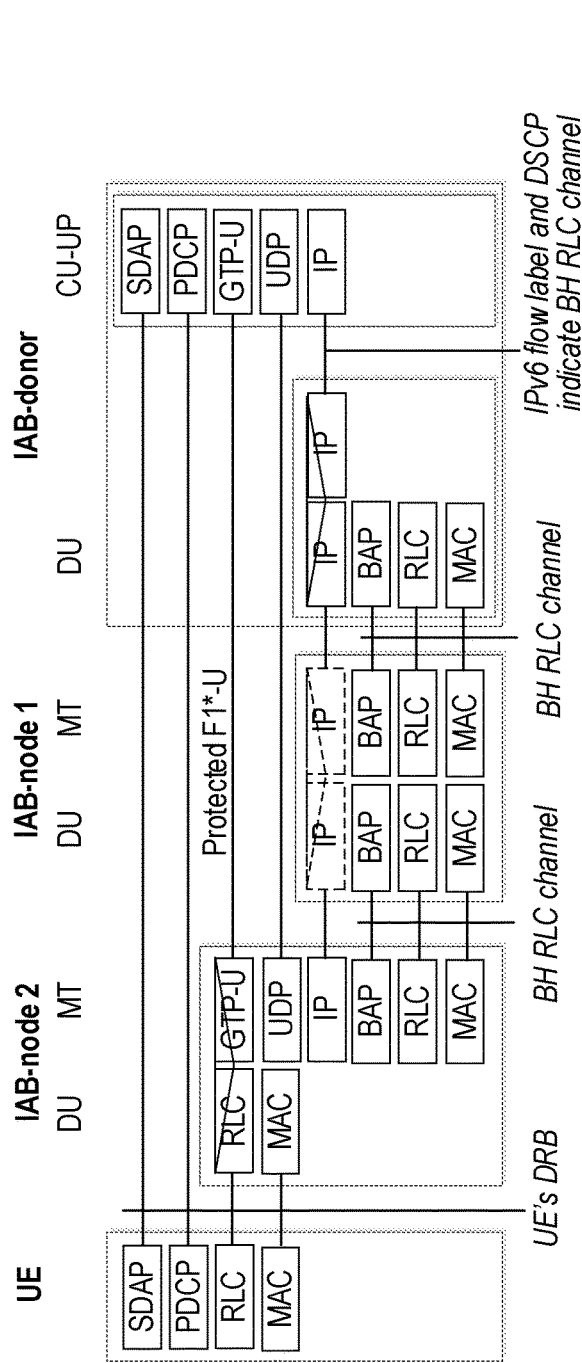
FIG. 4 shows an exemplary IAB user plane (UP) protocol stack.

FIGS. 4 and 5 show exemplary IAB user plane (UP) and control plane (CP) protocol stacks, respectively, as defined in 3GPP Rel-16. As shown in these figures, the chosen protocol stacks reuse the current CU-DU split specification in 3GPP Rel-15, where the full user plane F1-U (GTP-U/UDP/IP) is terminated at the IAB node (e.g., like a normal DU) and the full control plane F1-C (F1-AP/SCTP/IP) is also terminated at the IAB node (also like a normal DU). In the above cases, Network Domain Security (NDS) has been employed to protect both UP and CP traffic: IPsec for UP, DTLS for CP. IPsec could also be used for the CP protection instead of DTLS.

A new Backhaul Adaptation Protocol (BAP) layer has been introduced in the IAB nodes and the IAB donor. The BAP layer routes packets to the appropriate downstream/upstream node. The BAP layer also maps UE bearer data to the proper backhaul RLC channel, as well as between ingress and egress backhaul RLC channels in intermediate IAB nodes. The BAP layer can be configured to satisfy the end to end QoS requirements of bearers.

As shown in FIG. 4, both the IAB-donor and the UE will always have PDCP, RLC, and MAC layers, while the intermediate IAB-nodes will only have RLC and MAC layers. Each PDCP transmitter entity in FIG. 4 receives PDCP service data units (SDUs) from higher layers and assigns each SDU a Sequence Number before delivery to the RLC layer. A discardTimer is also started when a PDCP SDU is received. When the discardTimer expires, the PDCP SDU is discarded and a discard indication is sent to lower layers. In response, RLC will discard a corresponding RLC SDU if possible.

Each PDCP receiver entity in FIG. 4 starts a reordering timer (e.g., t-reordering) when it receives packets out-of-order. When t-reordering expires, the PDCP entity updates the variable RX_DELIV which indicates the value of the first PDCP SDU not delivered to the upper layers (e.g., the lower side of a receiving window).

Each RLC transmitter entity in FIG. 4 associates a sequence number with each SDU received from higher layers (e.g., PDCP). In acknowledged-mode (AM) operation, the RLC transmitter can set a poll bit to request the RLC receiver to transmit a status report on RLC PDUs sent by the transmitter. Upon setting the poll bit, the RLC transmitter starts a timer (e.g., t-pollRetransmit). Upon expiration of this timer, the RLC transmitter can again set again the poll bit and can retransmit those PDUs that were awaiting acknowledgement.

On the other hand, an RLC receiver will start a timer (e.g., t-reassembly) when RLC PDUs are received out of sequence. A missing PDU can be determined based on a gap in RLC sequence numbers. This function is similar to the t-reordering timer in PDCP. When t-reassembly expires during AM operation, the RLC receiver will transmit a status report to trigger a retransmission by the RLC transmitter.

Once a MAC transmitter entity in FIG. 4 receives SDUs from higher layers (e.g., RLC) for transmission, it can request a resource grant for transmitting the corresponding MAC PDUs. The MAC transmitter can request a resource grant by sending either a scheduling request (SR) or a buffer status report (BSR).

Figure 5A:
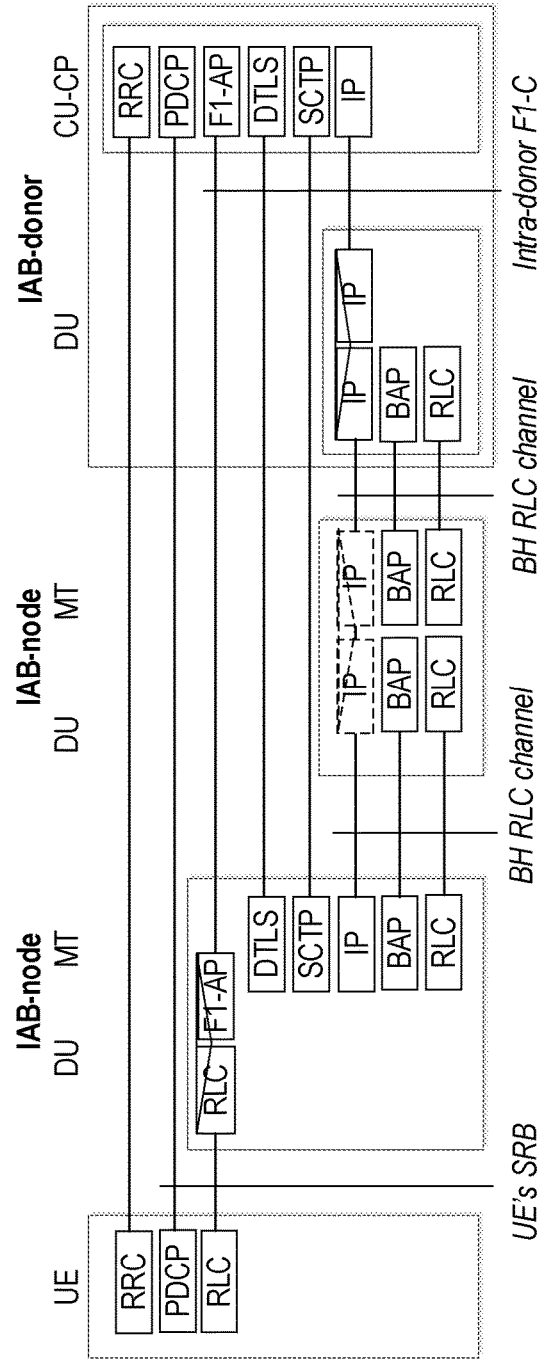
FIGS. 5A-C show various exemplary IAB control plane (CP) protocol stacks.
Figure 5B:
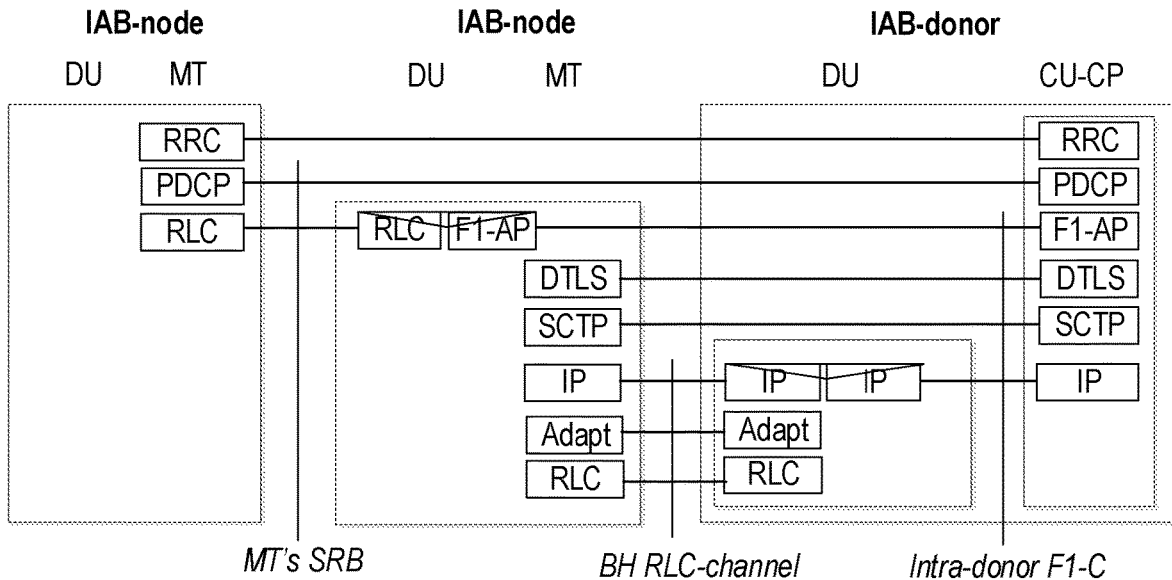
Figure 5C:
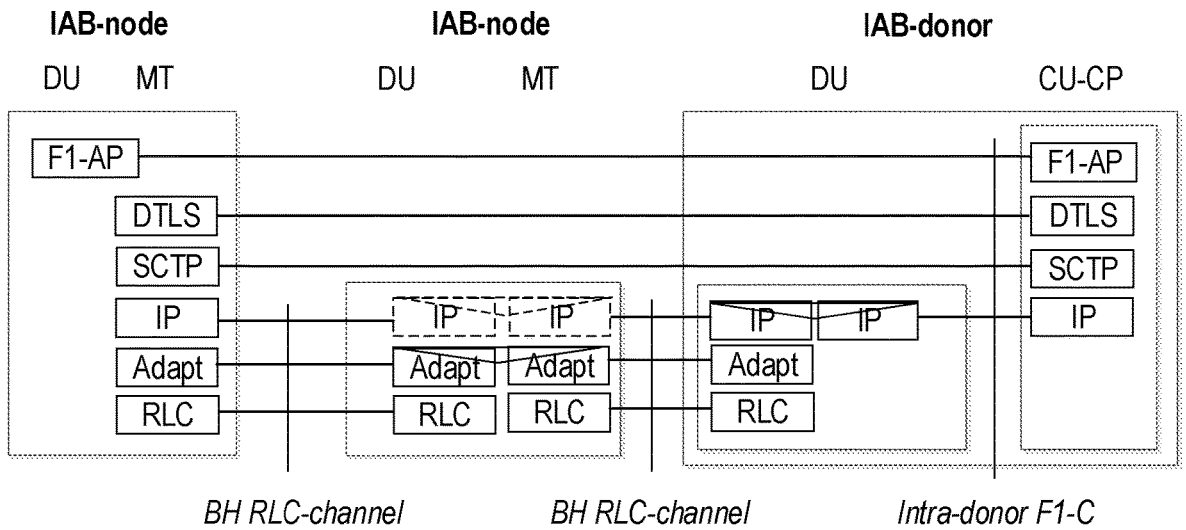

FIGS. 5A-5C show three exemplary CP protocol stacks used in the 3GPP Rel-16 IAB network architecture. FIG. 5A shows the CP protocol stack between the IAB-donor CU and a UE, which at the highest level consists of the RRC protocol carried by PDCP. Beneath these higher layers is RLC between UE and serving IAB-node DU, as well as F1-AP between serving IAB-node MT and the IAB-donor CU.

FIG. 5B shows the CP protocol stack between the IAB-donor CU and an IAB-node MT, which is functionally very similar to the CP between the IAB-donor CU and the UE shown in FIG. 5A. FIG. 5C shows the CP protocol stack between the IAB-donor CU and an IAB-node DU, which utilizes F1-AP at the highest level. This traffic is carried over DTLS/SCTP/IP between the IAB-donor CU and the corresponding IAB-node MT.

Setup and configuration (collectively referred to as "integration") are the first steps in the operation of the IAB node includes. An exemplary integration procedure includes the following operations:

1. MT setup
   a. MT selects parent node (procedure is FFS).
   b. MT authenticates with AMF (Uu procedures)
   c. AMF authorizes MT at gNB (signaling agreed at RAN3 #103)
   d. gNB establishes SRBs with MT (Uu procedures)
   e. gNB may establish DRBs and PDU session with MT (Uu procedures; if this is necessary is FFS). A PDU session may be used for OAM connectivity The IAB node will first connect via its MT functionality using RRC setup procedure. After RRC connection setup, the MT functionality of the IAB node could perform NAS-level registration and authentication, but no PDU session establishment is required. After the NAS registration, UE context for the IAB node can be created in the RAN (without any PDU session resources). In this way, there is no need to support any SMF/UPF functionality for the IAB nodes. NAS Rel-15 already separates the NAS registration from the PDU session establishment, making it possible to only perform registration without setting up PDU sessions, as well as setting up a UE context in RAN without PDU session resources.

2. Backhaul setup
   a. Establishment of BH RLC channel between IAB-node MT and parent node.
      RAN2 decided that this configuration is done by CU-CP (e.g., using RRC).
      MT's CU-CP needs to know that MT belongs to an IAB node and not a UE, which it may derive, e.g., from MT authorization (agreed at RAN3 #103).
      The BH RLC channel further has to be marked with the corresponding priority/QoS-class on IAB-node MT and parent node.
   b. Establishment of adapt route(s) between IAB-node MT and IAB-donor DU. This includes:
      Configuration of adapt routing identifier(s) on IAB-node MT and IAB-donor DU (RAN2; FFS),
      Configuration of routing entries on all IAB-node's ancestor nodes for new routing identifier (RAN2; FFS),
   c. IP address allocation to IAB-node for adapt interface, which is routable from wireline fronthaul via adapt route.
      The IP address must be specific to IAB-donor DU so that CU can send IP packets to IAB-node via this specific IAB-donor DU and the new adapt route. The IAB-donor DU has to support a pool of IP addresses that are routable from wireline fronthaul for all descendant IAB-nodes.
      If IP assignment is done by CU, the CU must know IAB-donor-DU's available IP address pool for IAB nodes.
      If IP assignment is done via DHCPv4/6 with DHCP proxy on IAB-donor-DU, as proposed in TR, a transport mechanism of ARP/NDP on top of adapt layer needs to be defined.
      There may be other options for IP address allocation.
   Once the UE context for the IAB node is setup in the RAN, the RAN will establish one or more backhaul bearers that can be used for IP address assignment to IAB node. For the situations where the IAB node is not directly communicating with the IAB-Donor node, but via other (already attached/connected) IAB nodes, the forwarding information in all intermediate IAB nodes will be updated due to the setup of new IAB node.

3. DU setup
   a. DU establishes F1-C and cell activation using IP on adapt layer (procedure defined in TS 38.401 clause 8.5: F1 startup and cells activation).
   b. This includes OAM support for IAB-node DU via backhaul IP layer.
   After establishing connectivity to the operator's internal network, the DU functionality of IAB node and its cells/sectors need to be configured by the OAM before the DU can send an F1 SETUP REQUEST message to its corresponding CU, i.e., IAB-CU. The recommended architecture option for IAB supports the full IP connectivity to the IAB node, making it possible that the DU functionality can have direct IP connectivity to the OAM, instead of relying on the MT functionality to establish a special PDU session in the CN for OAM. Finally, after configuring the DU functionality of the IAB node, the IAB node becomes operational as a DU and UEs will not be able to distinguish it from other gNBs. As such, it can start serving UEs like any other DU/gNB.

Note that the protocol architectures illustrated in FIGS. 4-5 can manage IP address assignment internally in the RAN without CN involvement. In that respect, the above baseline allows for DHCP-based IP address assignment and setting up the OAM after IP address assignment without an MT establishing a PDU session. The three parts of the overall IAB node integration procedure are discussed below.

Figure 6:
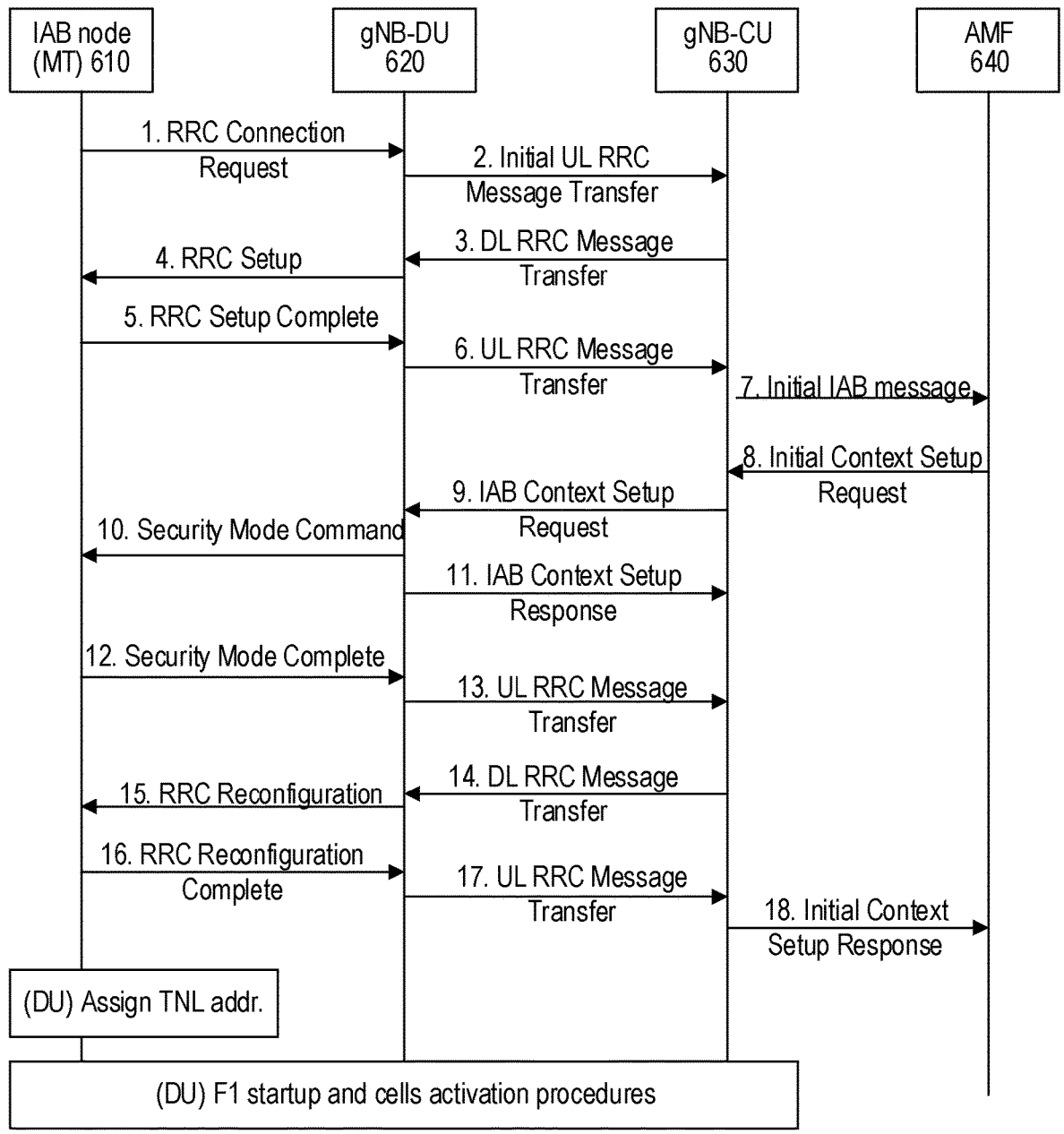
FIG. 6 shows an exemplary procedure for integrating an IAB node into an NG-RAN.

The procedure for initial IAB node access can be based on the UE Initial Access signaling flow with slight modifications to fulfil the IAB node requirements. Meanwhile, for activation of IAB node DU cells, the F1 Startup and cells activation procedure defined in TS 38.401 can be reused as is. Taking the above into account, FIG. 6 shows an exemplary procedure for integrating an IAB node (610, including an MT and DU) into an NG-RAN that includes a split gNB (gNB-CU 630, gNB-DU 620). FIG. 6 also shows interactions with an AMF (640) in the 5GC. Although the operations shown in FIG. 6 and described below are numbered sequentially, this numbering is used to facilitate explanation rather than to limit the operations to occur in any particular order, unless specifically noted to the contrary.

1. The IAB node (e.g., the MT) sends an RRCConnectionRequest message to the gNB-DU.
2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the C-RNTI allocated by the gNB-DU.
3. The gNB-CU allocates a gNB-CU UE F1AP ID for the IAB node and generates RRCSetup message towards the IAB node. The RRC message is encapsulated in the DL RRC MESSAGE TRANSFER message.
4. The gNB-DU sends the RRCSetup message to the IAB node.
5. The IAB node sends the RRC CONNECTION SETUP COMPLETE message to the gNB-DU. The S-NS SAI IE in the RRC CONNECTION SETUP COMPLETE message indicates the IAB node.
6. The gNB-DU encapsulates the RRC message in the UL RRC MESSAGE TRANSFER message and sends it to the gNB-CU.
7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.
9. The gNB-CU sends the IAB CONTEXT SETUP REQUEST message to establish the IAB node context in the gNB-DU. In this message, it may also encapsulate the SecurityModeCommand message.
10. The gNB-DU sends the SecurityModeCommand message to the IAB node.
11. The gNB-DU sends the IAB CONTEXT SETUP RESPONSE message to the gNB-CU.
12. The IAB node responds with the SecurityModeComplete message.
13. The gNB-DU encapsulates the RRC message in the UL RRC MESSAGE TRANSFER message and sends it to the gNB-CU.
14. The gNB-CU generates the RRCReconfiguration message and encapsulates it in the DL RRC MESSAGE TRANSFER message. The RRCReconfiguration could include a configuration of one or more IAB backhaul bearers.
15. The gNB-DU sends RRCReconfiguration message to the IAB node.
16. The IAB node sends RRCReconfigurationComplete message to the gNB-DU.
17. The gNB-DU encapsulates the RRC message in the UL RRC MESSAGE TRANSFER message and sends it to the gNB-CU.
18. The gNB-CU sends the INITIAL CONTEXT SETUP RESPONSE message to the AMF.

At this point, the IAB node will have established one or more backhaul bearers that can be used for creating TNL connectivity (e.g., for the IAB-DU) toward gNB-CU and assigning a TNL address (e.g., IP address and port). Next, the IAB node (e.g., the DU) can utilize the F1 Startup and Cells Activation procedures described in 3GPP TS 38.401 (v15.6.0) to activate its cells and become operational. After activating its cells, the IAB node is operational and can serve the UEs via the DU. The UEs can connect to the IAB node via the UE Initial Access procedure described in 3GPP TS 38.401 (v15.6.0).

In general, the network can configure a UE (including an MT) to perform measurements, e.g., for mobility reasons. The measurement framework in NR is mainly adopted from LTE, with some additional features. The following description focuses mainly on measurements related to NR, but most of the concepts are similar in LTE. 3GPP TS 36.331 (v15.6.0) section 5.5 and 3GPP TS 38.331 (v15.6.0) section 5.5 describe additional details of measurement configurations/operations in LTE and NR, respectively. NR measurement configurations include the following parameters:

1. Measurement objects: A list of objects on which the UE shall perform the measurements:
    For intra-frequency and inter-frequency measurements a measurement object is associated to an NR carrier frequency. Associated with this NR carrier frequency, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
    For inter-RAT E-UTRA measurements a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
2. Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

Reference Signal (RS) type: The RS that the UE uses for beam and cell measurement results (SS/PBCH block or CSI-RS).

Reporting format: The quantities per cell and/or per beam that the UE includes in the measurement report (e.g., RSRP) and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting of that measurement type. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements, i.e., no (UL, DL) transmissions are scheduled.

A UE in RRC_CONNECTED state maintains a single measurement object list, a single reporting configuration list, and a single measurement identities list. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

In general, measurement procedures can distinguish the following types of cells:

The serving cell(s)—these are the SpCell (Special cells. In case of DC, the PCell of the MCG or the PSCell of the SCG) and one or more SCells, if configured for a UE supporting CA.

Listed cells—these are cells listed within the measurement object(s).

Detected cells—these are cells that are not listed within the measurement object(s) but are detected by the UE on the carrier frequency(ies) indicated by the measurement object(s).

For NR measurement object(s), the UE measures and reports on the serving cell(s), listed cells and/or detected cells.

Measurements in NR can be configured to be reported periodically or based on events. If a UE is configured with a periodic measurement configuration, then it will send available measurement every time the assigned periodicity for that measurement expires. When it comes to event triggered measurements, there are several events defined:

1. Ax-events (related to intra-RAT measurement reporting):

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell.

2. Bx-events (related to inter-RAT measurement reporting):

Event B1: Neighbour becomes better than absolute threshold;

Event B2: PCell becomes worse than absolute threshold1 AND Neighbour becomes better than another absolute threshold2

Even so, measurements are not mandatory for handover decisions; if desired, the network can instruct the UE to perform a handover to another node/cell without benefit of UE measurements (e.g., based only on load conditions in the serving and neighboring cells). However, proper measurement configuration and reporting will ensure that the UE will be handed over only when needed and towards the node/cell that offers it the best conditions, considering both the needs of the UE bearers as well as current load conditions in the serving and neighboring cells.

Figure 7:
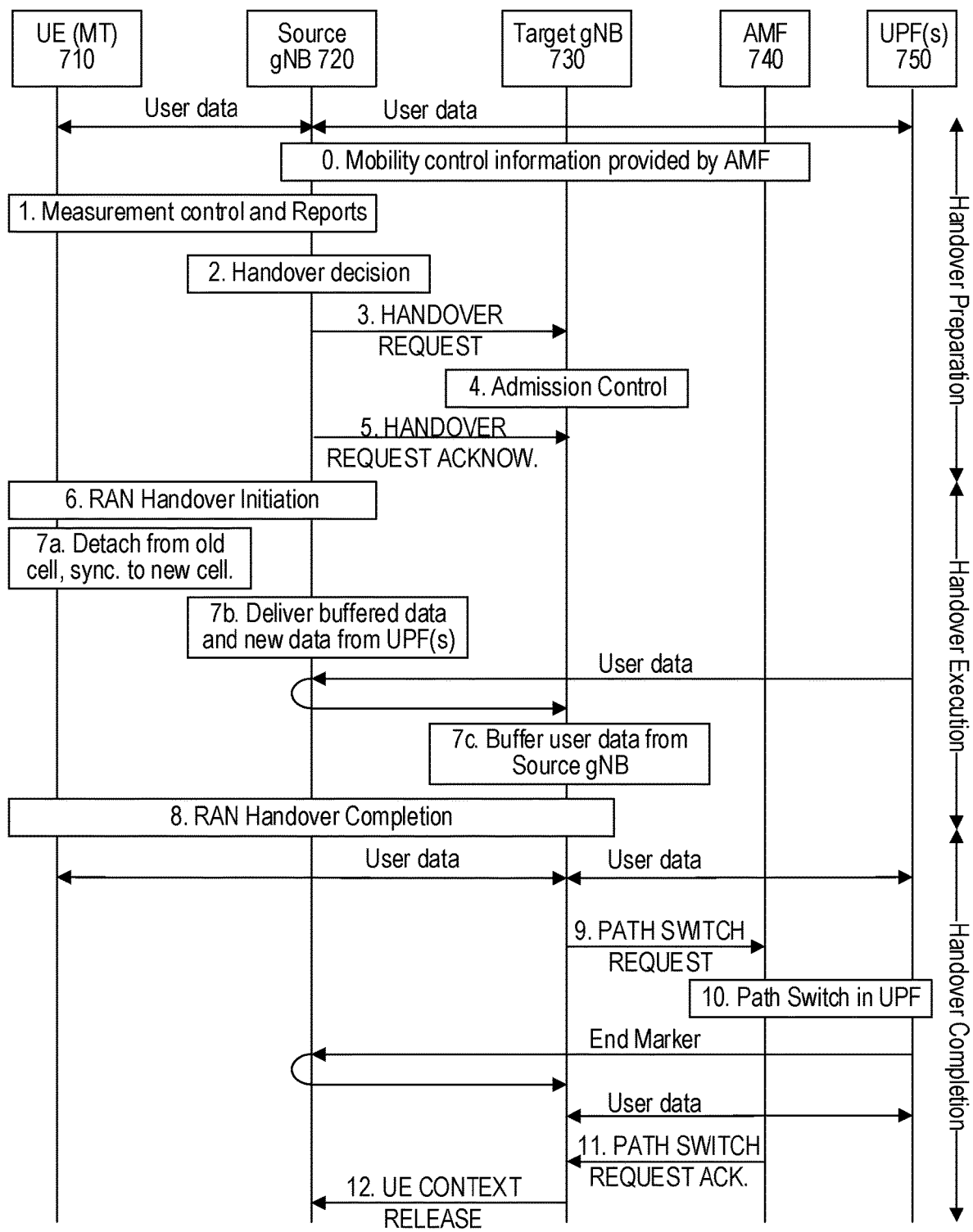
FIG. 7 shows an exemplary handover procedure in an NR network, in which neither the access and mobility management function (AMF) nor the user plane function (UPF) changes for the UE.

Intra-NR RAN handover includes the preparation and execution phase of the handover procedure, which is performed without involvement of the 5GC. In other words, preparation messages are directly exchanged between the involved gNBs. The release of the resources at the source gNB during the handover completion phase is triggered by the target gNB. FIG. 7 shows a signal flow diagram for an exemplary handover scenario of a UE (710, e.g., an MT) from a source gNB (720) to a target gNB (730), where neither the AMF (740) nor the UPF (750) changes. Although the operations shown in FIG. 7 and described below are numbered sequentially, this numbering is used to facilitate explanation rather than to limit the operations to occur in any particular order, unless specifically noted to the contrary.

0. At this point, the UE context in the source gNB contains mobility control information regarding roaming and access restrictions which were provided by the AMF either at connection establishment or at the last TA update. At or before this point, the UE may also be transmitting (UL) and/or receiving (DL) user data with the AMF via the source gNB.

1. The source gNB configures the UE measurement procedures and the UE reports according to the measurement configuration.

2. The source gNB decides to handover the UE, based on MeasurementReport and RRM information.

3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information (if supported) and QoS flow level QoS profile(s).

NOTE: After issuing a Handover Request, the source gNB should not reconfigure the UE, including performing Reflective QoS flow to DRB mapping.

4. Admission Control may be performed by the target gNB. Slice-aware admission control shall be performed if the slice information is sent to the target gNB. If the PDU sessions are associated with non-supported slices the target gNB shall reject such PDU Sessions.

5. The target gNB prepares the handover with L1/L2 and sends the HANDOVER REQUEST ACKNOWLEDGE to the source gNB, which includes a transparent container to be sent to the UE as an RRC message to perform the handover.

6. The source gNB initiates Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

7. In operation 7a, the UE detaches from the current cell (provided by the source gNB) and attempts to synchronize to the target cell (provided by the target gNB). In operation 7b, the source gNB delivers to the target gNB any data it has buffered for the UE, as well as any newly arriving data (indicated by the redirected "user data"). In operation 7c, the target gNB buffers this received data. Although not shown, the source gNB can send an SN STATUS TRANSFER message to the target gNB.

8. After the UE has synchronised to the target cell, it completes the handover procedure by sending RRCReconfigurationComplete message to target gNB. UL user data can then be transferred between the UE and the UPF via the target gNB, as illustrated.

9. The target gNB sends a PATH SWITCH REQUEST message to AMF to trigger 5GC to switch the DL data path towards the target gNB and to establish an NG-C interface instance towards the target gNB.

10. 5GC switches the DL data path towards the target gNB. The UPF sends one or more "end marker" packets on the old path to the source gNB per PDU session/tunnel and then can release any U-plane/TNL resources towards the source gNB.

11. The AMF responds to the PATH SWITCH REQUEST message with the PATH SWITCH REQUEST ACKNOWLEDGE message.

12. Upon reception of the PATH SWITCH REQUEST ACKNOWLEDGE message from the AMF, the target gNB sends the UE CONTEXT RELEASE message to inform the source gNB about the success of the handover. The source gNB can then release radio and C-plane resources associated with the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available.

And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:

Common RACH configuration;
Common RACH configuration+Dedicated RACH config. associated with SSB; or
Common RACH configuration+Dedicated RACH config. associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

Since LTE Rel-8, Automatic Neighbor Relations (ANR) has been standardized to enable an eNB to automatically establish a relationship with another eNB by facilitating an automatic setup of an X2 interface between the two eNBs. This can be done by the serving eNB configuring a UE with a physical cell identity (PCI) and a frequency to receive and/or measure (e.g., a measurement object), so that the UE reads the system information of the configured neighbor cell broadcast in System Information Block 1 (SIB1) and reports relevant received information such as cell global identifier (CGI), tracking area code (TAC), public land mobile network (PLMN) identifier, etc. to the serving eNB in a measurement report. The CGI is a globally unique identifier for a base station (e.g., eNB or gNB), and includes four parts: Mobile Country Code (MCC), Mobile Network Code (MNC), Location Area Code (LAC), and Cell Identification (CI). For eNBs, the CGI is referred to as "eCGI" and also includes an eNB-ID. As used herein, however, the term "CGI" encompasses globally unique identifiers for any type of base station, including eNBs and gNBs.

Figure 8:
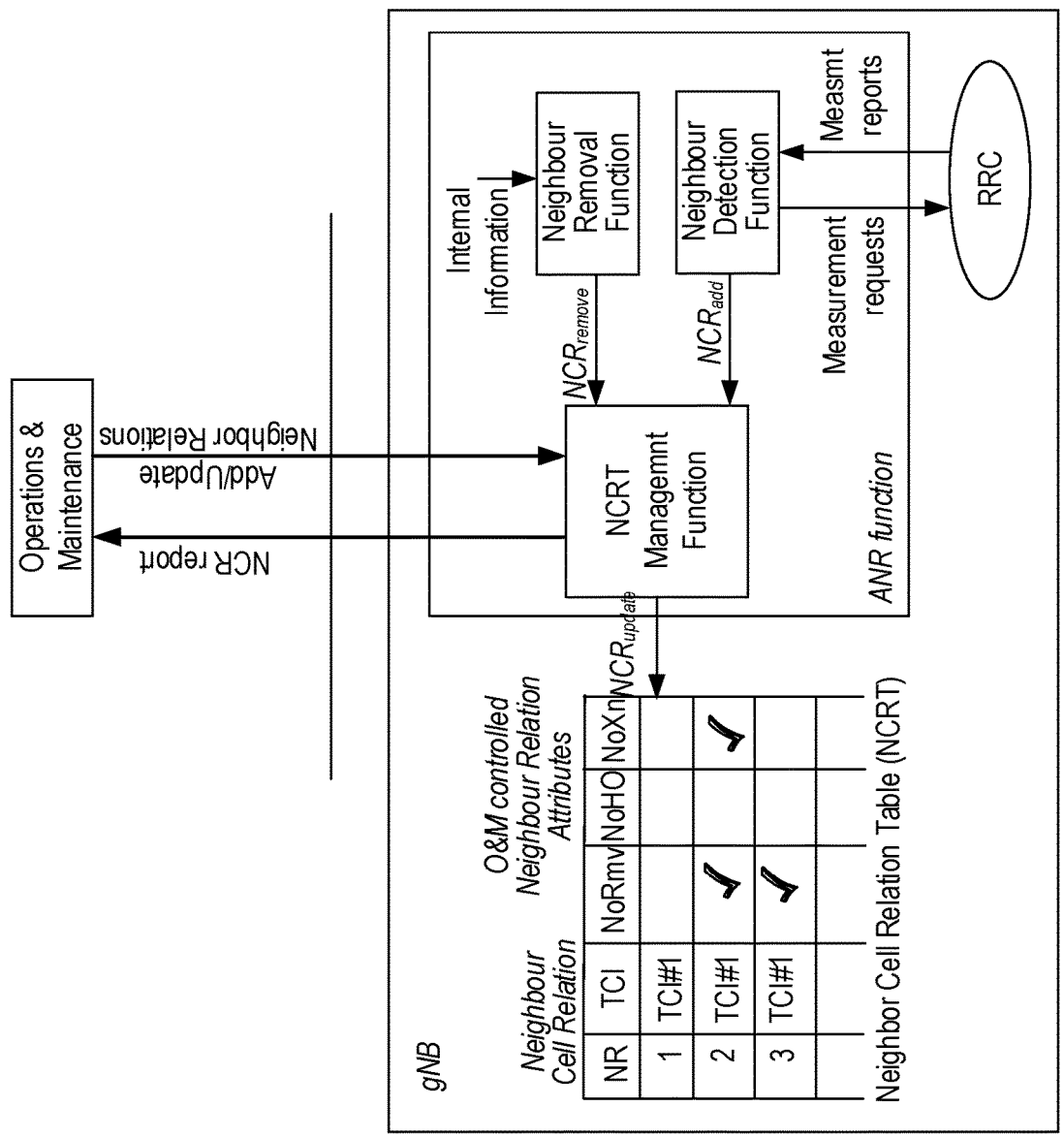
FIG. 8 shows an exemplary configuration of an automatic neighbour relations (ANR) function between a gNB and an Operations and Maintenance (O&M) function in an NR network.

FIG. 8 illustrates the configuration of the ANR function between a gNB and an Operations and Maintenance (O&M) function in an NR network. In this arrangement, the ANR function resides in the gNB and manages the conceptual Neighbor Cell Relation Table (NCRT). Located within ANR, the Neighbor Detection Function finds new neighbors and adds them to the NCRT. In general, this is done by issuing measurement requests to, and receiving measurement reports, from the RRC function in the gNB. ANR also contains the Neighbor Removal Function which removes outdated neighbor relations from the NCRT. This can be based on internal information, e.g., concerning past usage (or non-usage) of specific neighbor relations. The Neighbor Detection Function and the Neighbor Removal Function are implementation-specific but, as shown in FIG. 8, operate on the NCRT via the NCRT Management Function.

The NCRT Management Function also allows O&M to manage the NCRT. For example, O&M can add/delete neighbor cell relations and modify the attributes of the NCRT via the NCRT Management Function. The O&M system is informed about changes in the NCRT made by the eNB through reports from the NCRT Management Function.

In the context of ANR, a neighbor cell relation (NCR) can be explained as follows. An existing NCR from a source cell to a target cell means that gNB controlling the source cell: a) knows the ECGI/CGI and PCI of the target cell; b) has an entry in the NCRT for the source cell identifying the target cell; and c) has the attributes in this NCRT entry defined, either by O&M or set to default values. The source-cell gNB keeps a NCRT for each source cell that the gNB provides. For each NCR, the NCRT contains the Target Cell Identifier (TCI), which identifies the target cell. For E-UTRAN, TCI corresponds to the E-UTRAN CGI (ECGI) and the PCI of the target cell. For NG-RAN, TCI corresponds to the NR CGI and the PCI of the target cell.

As shown in FIG. 8, each NCR has three attributes: NoRemove (or "NoRmv" for short), NoHO, and NoXn. If NoRemove is checked (e.g., indicated as positive in the NCRT), the eNB shall not remove the particular NCR from the NCRT. If NoHO is checked, the NCR shall not be used by the eNB for handover reasons. If NoXn is checked, the Neighbor Relation shall not use an Xn interface in order to initiate procedures towards the gNB that provides the target cell. For the purposes of clarity, NCRs are cell-to-cell relations, while an Xn link is set up between two gNBs that provide the respective cells. Furthermore, NCRs are unidirectional, while an Xn link is bidirectional.

Figures 9, 10:
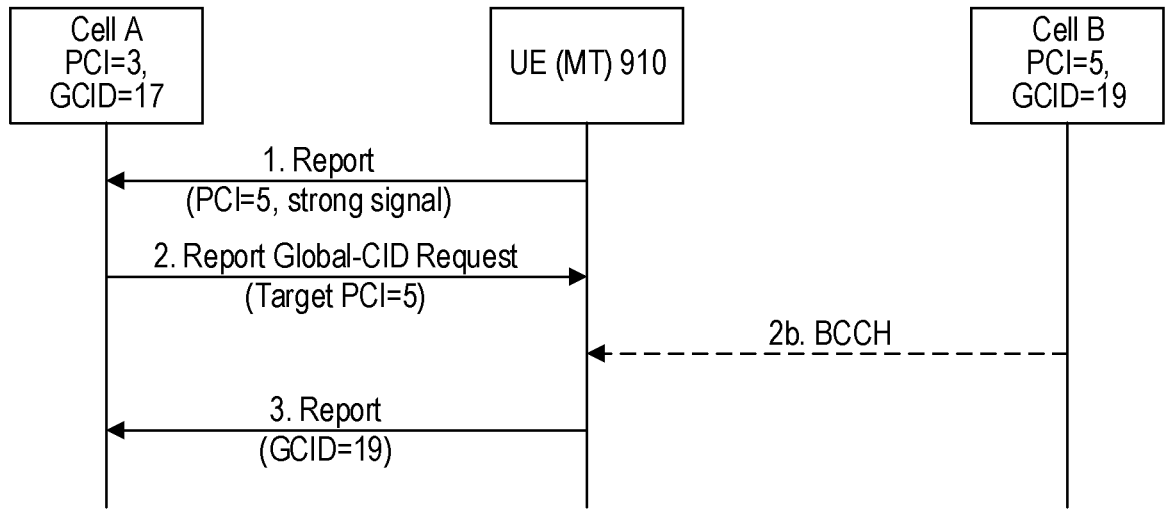
FIG. 9 shows an exemplary procedure where an NG-RAN node serving cell utilizes an ANR function.
FIG. 10 shows an exemplary neighbour cell relations table (NCRT) that includes an IAB capability ("JAB" column) indicator for each listed cell, according to various embodiments of the present disclosure.

FIG. 9 depicts an example scenario where an NG-RAN node utilizes ANR functionality with respect to a cell ("Cell A") that it serves. Prior to the operations shown in FIG. 9, the NG-RAN node instructs each UE in RRC_CONNECTED state in cell A to perform measurements on neighbor cells, including cell B. The NG-RAN node may use different policies for instructing UE's to perform measurements, and when to report them to the NG-RAN node. This measurement procedure is specified in 3GPP TS 38.331 (v15.6.0) and 36.331 (v15.6.0).

In particular, FIG. 9 shows operations performed by a particular UE in RRC_CONNECTED state in cell A. The UE could also be an MT, as indicated by the reference designation UE (MT) 910. Although the operations shown in FIG. 9 and described below are numbered sequentially, this numbering is used to facilitate explanation and understanding rather than to limit the operations to occur in any particular order, unless specifically noted to the contrary.

1. The UE sends a measurement report regarding cell B. This report contains cell B's PCI, but not its NCGI/ECGI.

When the NG-RAN node receives a UE measurement report containing the PCI, the following sequence may be used:

2. The NG-RAN node sends a Report Global-CID Request to instruct the UE to read all the broadcast NCGI(s)/ECGI(s), TAC(s), RANAC(s), PLMN ID(s) and, for neighbour NR cells, NR frequency band(s). The request can include the PCI of cell B that was received in operation 1. The NG-RAN node may need to schedule appropriate idle periods to allow the UE to read the NCGI/ECGI from the BCCH of the detected neighbour cell (e.g., operation 2b on cell B in FIG. 9). How the UE reads the NCGI/ECGI is specified in 3GPP TS 38.331/36.331, discussed above.

3. When the UE has found the new cell's NCGI(s)/ECGI(s), the UE reports these to the NG-RAN node serving cell A. In addition, the UE reports other cell parameters that have been read by the UE, including those listed above. In case the detected NR cell does not broadcast SIB1, the UE may report a noSIB1 indication as specified in 3GPP TS 38.331 (v15.6.0).

Based on the information reported in operation 3, the NG-RAN node decides to add this neighbour relation, and can use the PCI and NCGI(s)/ECGI(s) to:

a. Lookup a transport layer address to the new NG-RAN node.

b. Update the Neighbour Cell Relation List.

c. If needed, set up a new Xn interface towards this NG-RAN node.

Currently, the Xn interface specification (3GPP TS 38.423) enables neighboring gNBs, CUs, or eNBs to exchange information about their served cells and neighboring cells by means of Served Cell Information NR IEs and Served Cell Information E-UTRA IEs. In particular, the Served Cell Information NR IE is sent inside the XN SETUP REQUEST, XN SETUP RESPONSE, NG-RAN CONFIGURATION UPDATE, and NG-RAN CONFIGURATION UPDATE ACKNOWLEDGE messages on the Xn interface. The structure of the Served Cell Information NR IE from TS 38.423 (v15.4.0) is shown in Table 1 below.

TABLE 1

| IE/Group Name | Presence | Range | IE type/ref. | Semantics description |
|---|---|---|---|---|
| NR-PCI | M | | INTEGER (0 ... 1007, ...) | NR Physical Cell ID |
| NR CGI | M | | 9.2.2.7 | Cell Global ID |
| TAC | M | | 9.2.2.5 | Tracking Area Code |
| RANAC | O | | RAN Area Code 9.2.2.6 | |
| Broadcast PLMNs | | 1 ... \<maxnoofBPLMNs\> | | Broadcast PLMNs |
| >PLMN Identity | M | | 9.2.2.4 | |
| CHOICE NR-Mode-Info | M | | | |
| >FDD | | | | |
| >>FDD Info | | 1 | | |
| >>>UL NR Frequency Info | M | | NR Frequency Info 9.2.2.19 | |
| >>>DL NR Frequency Info | M | | NR Frequency Info 9.2.2.19 | |
| >>>UL Transmission Bandwidth | M | | NR Transmission Bandwidth 9.2.2.20 | |
| >>>DL Transmission Bandwidth | M | | NR Transmission Bandwidth 9.2.2.20 | |
| >TDD | | | | |
| >>TDD Info | | 1 | | |

TABLE 1-continued

| IE/Group Name | Presence | Range | IE type/ref. | Semantics description |
|---|---|---|---|---|
| >>>Frequency Info | M | | NR Frequency Info 9.2.2.19 | |
| >>>Transmission Bandwidth | M | | NR Transmission Bandwidth 9.2.2.20 | |
| Measurement Timing Configuration | M | | OCTET STRING | Contains the MeasurementTimingConfiguration inter-node message for the served cell, as defined in TS 38.331 [10]. |
| Connectivity Support | M | | 9.2.2.28 | |
| Broadcast PLMN Identity Info List NR | | 0 . . . <maxnoofBPLMNs−1> | | This IE corresponds to the PLMN-IdentityInfoList IE in SIB1 as specified in TS 38.331 [8]. The PLMN Identities and associated information contained in this IE shall be provided in the same order as broadcast in SIB1. |
| >Broadcast PLMNs | | 1 . . . <maxnoofBPLMNs> | | Broadcast PLMNs |
| >>PLMN Identity | M | | 9.2.2.4 | |
| >TAC | M | | 9.2.2.5 | |
| >NR Cell Identity | M | | BIT STRING (SIZE(36)) | |
| >RANAC | O | | RAN Area Code 9.2.2.6 | |

As briefly mentioned above, it can be beneficial for an IAB-donor CU to be aware of its neighboring IAB-capable nodes and cells. For example, an IAB-donor CU may want to select an IAB-capable target CU/cell for handover/redirection of an IAB node, e.g., for load-balancing purposes or mobility-induced inter-donor-CU migration. As another example, an IAB-donor CU that sends the resource allocation of its DUs to a neighbor CU (e.g., for Cross-Link Interference (CLI) management and/or other multi-CU resource management) will include IAB-related information only when sending to neighbors that support IAB and can understand IAB-related information. Other inter-node operations that are applicable only to IAB-capable nodes may be defined in future LTE/NR releases. Trying to perform any of the above operations without knowing a neighbor node's (or cell's) IAB capability can lead to errors or unpredictable behavior.

Embodiments of the present disclosure address these and other problems, challenges, and/or issues by providing techniques that enable an IAB donor-CU to become aware of its IAB-capable neighbors and act appropriately when interacting with these neighbors, depending on the neighbor's IAB capability. Some example scenarios where this can be beneficial include:

Selecting an IAB-capable target CU/cell for handover/redirection of an IAB node, e.g., for load-balancing purposes or mobility-induced inter-donor-CU migration of an IAB node.

In Cross-Link Interference (CLI) management, knowing a neighbor's CU's IAB capability will enable an IAB donor-CU to include IAB-related information only if the neighbor is IAB-capable.

Additionally, knowledge of a neighbor's capability can be useful in future-proofing IAB network design, by ensuring that IAB donor CUs will perform subsequently introduced IAB-related operations only with neighbor nodes that support IAB. The information can also be used to optimize UE measurement performance, such as by enabling the IAB donor CU to configure the MT part of an IAB node to perform measurements only on IAB-capable cells (e.g., by blacklisting non-IAB-capable neighbor cells, by whitelisting IAB-capable cells, etc.).

In some embodiments, an IAB donor-CU can become aware of the IAB-capable gNB-CUs (or DUs) in its vicinity by being informed by neighbor nodes about their respective IAB capabilities. In other embodiments, an IAB donor-CU can become aware of the IAB-capable gNB-CUs (or DUs) in its vicinity by instructing the MT part of an IAB node to include information about the IAB capabilities of its respective neighbor cells/nodes. Upon receiving such information, the IAB donor-CU can update/maintain the neighbor relation information with neighbor node's/cell's IAB capability. This information can then be used to decide on how the IAB donor-CU interacts with neighbor nodes/cells (e.g., during CLI management operations). Additionally, this information can also be used for further optimizations such as when configuring IAB node MT for measurement reporting (e.g., blacklisting non-IAB-capable cells from MT measurement configurations, reducing the overhead of measurements).

As briefly described above, an IAB node accesses the network via its MT part in a UE-like manner. Furthermore, at a given physical location, there may be coverage from both non-IAB-capable and IAB-capable cells, such that the IAB-MT must select an IAB-capable cell for initial access. Embodiments that enable an IAB donor-CU to become aware of its IAB-capable neighbors are based on one or more of the following exemplary conditions, assumptions, and/or premises discussed below.

1. 3GPP is currently discussing how an IAB-MT can identify the IAB-capable cells. Embodiments disclosed herein assume agreement on a solution in which IAB-capable cells broadcast an explicit IAB-capability indication that will assist an IAB-MT to select an appropriate parent cell.
2. Embodiments do not rely on a CU-UP/CU-CP split at the IAB donor-CU. In case the donor is split, then the functionalities described here for the CU are applicable for the CU-CP.
3. The present disclosure focuses primarily on NR (e.g., CUs, Xn interface, etc.). However, an IAB node operating under EN-DC (i.e., DC where LTE is the master node and NR is the secondary node) is also supported in 3GPP standards. As such, the mechanisms described here can be applied for LTE and X2 interface.
4. Exchanging the IAB capability between different CUs, according to some embodiments described below, via X2/Xn may be the easiest solution. However, vendors/operators may not like to communicate node capability information directly for several reasons. For example, information about a node's capability can be vendor-confidential. In those cases, the ANR-based approach where the IAB capability information is gathered via IAB-MT reporting can be the preferred technique.
5. A general assumption is that a CU can have some DUs that are IAB-capable and some that are not, such that the reporting must be on a per-cell level. However, a more practical deployment could be that all the DUs that are under an IAB-donor CU are IAB-capable. In that case, some signaling/measurement optimization could be envisioned where the UE's reporting of one cell's IAB-capability is used to infer the IAB capability of all the cells that are served by all the DUs that are under control by the same CU as the reported cell. Also, the NCRT could include that information per neighbor cell level, or per neighbor node level.

As mentioned above, in the legacy (i.e., non-IAB) case, the CU can instruct the UE to report measurements of neighbouring cells. Currently, neighbouring gNBs/gNB-CUs exchange the information about their served cells, as well as the about the neighbors of their served cells (Served Cell Information NR and Neighbor Information NR IEs in defined in 3GPP TS 38.423). The information is exchanged at Xn interface setup and can be updated at any later point, whereas the node capabilities are not exchanged over Xn. The IAB donor-CU receives served cell information from another CU, which means that the IAB donor-CU knows the PCIS and CGIs of the cells served by its neighbor CU.

Accordingly, the embodiments based on IAB-MT reporting of IAB capabilities of respective neighbor cells/nodes can involve one or more of the following operations:
1. An IAB-MT detects a neighbor cell and checks if that neighbor cell supports IAB (e.g., via an explicit indication broadcast in the cell).
   a. In a variant, the IAB-MT can check if the neighbor cell supports IAB only if it has been specifically instructed to do so for that specific cell or for all cells (e.g., in a manner similar to reporting of CGIs).
2. When sending measurement reports, the IAB-MT includes the IAB-capabilities of the respective reported cell(s).
   a. In a variant, upon receiving a measurement report from the IAB-MT that contains a PCI of the cell which IAB capability is unknown to the IAB-donor CU, the IAB-donor CU can configure the IAB-MT to report the IAB-capability of the cell (e.g., in a manner similar to reporting of CGIs)
   b. In a variant, an IAB-MT includes a flag (e.g., a BOOLEAN) that indicates whether the cell is IAB-capable.
   c. In a variant, the IAB capability indication is included only when the cell supports IAB and not included when the cell does not support IAB.
3. The IAB donor-CU checks its Neighbor Cell Relations Table (NCRT) records.
   a. (Conditional) If the PCI of the reported cell is already present in the NCRT, the IAB donor-CU adds the IAB capability of the corresponding cell to the records.
   b. (Conditional) If the PCI of the reported cell is not present in the NCRT, the IAB donor-CU instructs the IAB-MT to report the CGI of the cell (and optionally the IAB-capability, or IAB-MT will use this as an implicit request to report the IAB-capability as well). The IAB-MT reports the CGI of the cell (and optionally the IAB capability) to the IAB donor-CU. The IAB donor-CU creates an NCRT entry for the cell, that includes the CGI, PCI, IAB-capability, etc.
4. An IAB donor-CU now has information regarding which of its neighbor cells/nodes are to IAB-capable and can use that information for future interactions with the neighbors (e.g., use IAB related information only when communicating with IAB-capable neighbors) or future configuration of IAB-MTs (e.g., blacklist non IAB-capable cells in IAB-MT measurement configurations).

From the above steps it follows that the IAB donor-CU can create an "IAB capability'" entry in its NCRT for all its existing or newly added NRT entries. The above method is applicable for detecting both IAB-capable and IAB-incapable neighbor cells. FIG. 10 shows the exemplary NCRT of FIG. 8 being updated to include an IAB capability ("IAB" column) for each listed cell. In the table shown in FIG. 10, a "check mark" is used to indicate IAB capability in a similar manner as for the O&M controlled attributes.

If the IAB capability of a cell is broadcast in system information block 1 (SIB1) or other SIBs, UE/MT measurements on these SIBS of neighboring cells can be an expensive procedure. For example, an MT has to read the master information block (MIB) of the neighbor cell, from which it figures out where to find SIB1, and if the IAB capability is broadcasted in another SIB, it has to figure out from the SIB1 where to find this SIB, and then read that SIB, etc.

This is similar to reporting CGIs broadcast in SIB1, for which UEs are expected to take considerable time. Such CGI reporting is performed one at a time. For example, a UE reports a cell that the gNB does not have in its NCRT. The gNB send an update of the measurement configuration requesting the CGI of that particular cell. Upon receipt, the UE starts a timer (T321), measures the CGI of that indicated cell (possibly using measurement gaps if needed), and reports the CGI. If timer T321 expires before the cell CGI is acquired, the UE initiates the measurement reporting procedure, stops performing the related measurements, and removes the corresponding measId for that specific measurement identity where the CGI was requested, implicitly indicating that CGI measurement attempt has failed. The value of T321 is set to one second for measuring E-UTRA cells, two seconds for measuring NR cells operating at FR1 frequencies (e.g., <6 GHz) and 16 seconds for measuring NR cells operating at FR2 frequencies (e.g., >6 GHz).

In various embodiments, mechanisms similar to CGI reporting can be adopted for IAB capability reporting, where the IAB MT can initially report measurements without checking IAB capability and if the CU does not have information about the IAB capability of the reported cell, it can reconfigure the measurement configuration of the MT to report the IAB capability for that cell. Note that CGI reporting is usually triggered just before handover so that the source node knows to which neighbour node the cell belongs, and initiates Xn/X2 interface (if not already existing and if supported by the neighbour node). In the case of IAB capability reporting, if the cell does not support IAB, the MT cannot be handed over to that cell. As such, it can be beneficial for IAB capability reporting to indicate more than one cell. For example, the CU can indicate the MT to report the IAB capability of the top n cells from the measurement report just received from the MT.

If the IAB node is not active yet and being set up, it could be beneficial to get the IAB-MT to read all the SIBs of all the indicated cells and report their IAB capability, which will help the CUs to build the NRT very quickly. However, if the IAB node is already active and serving UEs or other IAB nodes, this could take considerable time and may impact the performance of these UEs and/or IAB nodes. As such, in some embodiments, the IAB MT can start checking the IAB capability of the indicated cells one by one, starting from the first cell in the indicated list of cells. If it finds a cell that supports IAB, the MT can report that cell immediately and stop the checking. For example, if the first cell in the list supports IAB, then the MT needs to check only the SIB of the first cell; but if the first cell does not support IAB, then the MT also needs to check the SIB of the second cell, and so on. When the network gets a report indicating the support of IAB for a certain cell, it can update the NCRT and also be able to handover the IAB to that cell.

In some embodiments, if the cell in position x is the first one in the list that supports IAB, then the MT can report just the PCI of that cell and its IAB capability, which can be interpreted by the CU that all the cells that were in the list before position x do not support IAB. Alternatively, the IAB MT can explicitly report all the cells (e.g., from position 1 to position x) and their IAB capabilities (e.g., false for cells at position 1 to x−1, and true for cell at position x). In this case, it may be unnecessary to indicate the cell ID, and instead just send a bit map, e.g., 000000010000, where the "1" corresponds to position x.

Other embodiments that are based on neighbour node reporting of IAB capabilities can be realized by enhancements to various messages exchanged between nodes, such as over an Xn interface. For example, the Served Cell Information NR IEs (defined in 3GPP TS 38.423 (v15.4.0)) shown in Table 1 above can be updated by adding the following field:

| IE/Group Name | Presence | Range | IE type/ref. | Semantics description |
|---|---|---|---|---|
| IAB capable | O | | ENUMERATED (true, false, . . .) | "true" indicates that the cell supports IAB, while "false" indicates the cell does not support IAB |

Similarly, the Neighbour Information NR IE (defined in 3GPP TS 38.423) can be updated by adding a similar field, as shown in Table 2 below.

TABLE 2

| IE/Group Name | Presence | Range | IE type/ref. | Semantics description |
|---|---|---|---|---|
| Neighbour Information NR | | 1 . . . <maxnoofNeighbours> | | |
| >NRPCI | M | | INTEGER (0 . . . 1007) | NR Physical Cell ID |
| >NR CGI | M | | 9.2.2.7 | |
| >IAB capable | O | | ENUMERATED (true, false) | "true" indicates that the cell supports IAB, while "false" indicates the cell does not support IAB |
| >TAC | M | | 9.2.2.5 | Tracking Area Code |
| >RANAC | O | | RAN Area Code 9.2.2.6 | |
| >CHOICE NR-Mode-Info | M | | | |
| >>FDD | | | | |
| >>>FDD Info | | 1 | | |
| >>>>UL NR FreqInfo | M | | NR Frequency Info 9.2.2.19 | |
| >>>>DL NR FreqInfo | M | | NR Frequency Info 9.2.2.19 | |
| >>TDD | | | | |
| >>>TDD Info | | 1 | | |
| >>>>NR FreqInfo | M | | NR ARFCN Frequency Info 9.2.2.19 | |

TABLE 2-continued

| IE/Group Name | Presence | Range | IE type/ref. | Semantics description |
|---|---|---|---|---|
| >Connectivity Support | M | | 9.2.2.28 | |
| >Measurement Timing Configuration | M | | OCTET STRING | Contains the MeasurementTimingConfiguration inter-node message for the neighbour cell, as defined in TS 38.331. |

The above-described message enhancements involve reporting on a per-cell basis. In some cases, however, the IAB capability can be the same for all the cells of all the DUs controlled by the same CU. In such cases, the IAB capability can be indicated at the NG-RAN node level. This could be done, for example, by adding IAB capability reporting to an XN SETUP REQUEST message, such as shown in Table 3 below. Similar enhancements can be made to an XN SETUP RESPONSE message, such as shown in Table 4 below. Both of these messages are sent by an NG-RAN node to a neighboring NG-RAN node to transfer application data for an Xn-C interface instance. Similar enhancements can also be made to an NG-RAN NODE CONFIGURATION UPDATE message.

Alternately, most of the cells of all the DUs could have the same IAB capability with only a few differing. In such case, the dominant IAB capability can be indicated at the node level, whereas the IAB capability exceptions can be reported on a per-cell level, such as in the embodiments previously described.

TABLE 3

| IE/Group Name | Presence | Range | IE type/ref. | Semantics description |
|---|---|---|---|---|
| Message Type | M | | 9.2.3.1 | |
| Global NG-RAN Node ID | M | | 9.2.2.3 | |
| IAB capable | O | | ENUMERATED (true, false) | "true" indicates that the node supports IAB, "false" indicates the node does not support IAB |
| TAI Support List | M | | 9.2.3.20 | List of supported TAs and associated characteristics. |
| AMF Region Information | M | | 9.2.3.83 | List of all the AMF Regions to which the NG-RAN node belongs. |
| List of Served Cells NR | | 0 ... <maxnoofCellsinNG-RANnode> | | Complete list of cells served by the gNB |
| >Served Cell Information NR | M | | 9.2.2.11 | |
| >Neighbour Information NR | O | | 9.2.2.13 | |
| >Neighbour Information E-UTRA | O | | 9.2.2.14 | |
| List of Served Cells E-UTRA | | 0 ... <maxnoofCellsinNG-RANnode> | | Complete list of cells served by the ng-eNB. |
| >Served Cell Information E-UTRA | M | | 9.2.2.12 | |
| >Neighbour Information NR | O | | 9.2.2.13 | |
| >Neighbour Information E-UTRA | O | | 9.2.2.14 | |
| Interface Instance Indication | O | | 9.2.2.39 | |

TABLE 4

| IE/Group Name | Presence | Range | IE type/ref. | Semantic description |
|---|---|---|---|---|
| Message Type | M | | 9.2.3.1 | |
| Global NG-RAN Node ID | M | | 9.2.2.3 | |

TABLE 4-continued

| IE/Group Name | Presence | Range | IE type/ref. | Semantic description |
|---|---|---|---|---|
| IAB capable | O | | ENUMERATED (true, false) | "true" indicates that the node supports IAB, "false" indicates the node does not support IAB |
| TAI Support List | M | | 9.2.3.20 | List of supported TAs and associated characteristics. |
| List of Served Cells NR | | 0 ... <maxnoofCellsinNG-RANnode> | | Complete list of cells served by the gNB |
| >Served Cell Information NR | M | | 9.2.2.11 | |
| >Neighbour Information NR | O | | 9.2.2.13 | |
| >Neighbour Information E-UTRA | O | | 9.2.2.14 | |
| List of Served Cells E-UTRA | | 0 ... <maxnoofCellsinNG-RANnode> | | Complete list of cells served by the ng-eNB |
| >Served Cell Information E-UTRA | M | | 9.2.2.12 | |
| >Neighbour Information NR | O | | 9.2.2.13 | |
| >Neighbour Information E-UTRA | O | | 9.2.2.14 | |
| Criticality Diagnostics | O | | 9.2.3.3 | |
| AMF Region Information | O | | 9.2.3.83 | List of all the AMF Regions to which the NG-RAN node belongs. |
| Interface Instance Indication | O | | 9.2.2.39 | |

The embodiments based on IAB-MT reporting of IAB capabilities of respective neighbor cells/nodes can also be realized by enhancements to existing messages in a similar manner as described above. For example, FIG. 11 shows an ASN.1 data structure corresponding to an exemplary ReportConfigNR IE for RRC, according to various embodiments of the present disclosure. This IE specifies criteria for triggering of an NR measurement reporting event. The example shown in FIG. 11 includes a reportIABCapability field containing a sequence of PCIs identifying cells for which the UE should report IAB capability/support. Note that this arrangement is different from the reportCGI case due to the possibility to indicate reporting of more than one cell. However, it is possible to align with CGI reporting and have an indication for only one cell for which the IAB capability should be reported.

As another example, FIG. 12 shows an ASN.1 data structure corresponding to an exemplary MeasConfig IE for RRC, according to various embodiments of the present disclosure. This IE specifies measurements to be performed by the UE, and covers intra-frequency, inter-frequency, and inter-RAT mobility, as well as configuration of measurement gaps. In FIG. 12, IAB capability reporting is controlled by the reportIABCapability field, which in this case is a true/false flag.

In addition to the message enhancements shown above, existing UE measurement reporting procedures can also be enhanced to include IAB capability reporting. Below is the text for a Measurement Identity Addition/Modification procedure (specified in 3GPP TS 38.331 (v15.6.0) section 5.5.2.3) and a Measurement Report Triggering procedure (section 5.5.4), with IAB capability reporting (indicated by underline) added. All section references (e.g., "5.5.5") are to existing sections in 3GPP TS 38.331, unless otherwise noted.

\*\*\* Begin text for 3GPP TS 38.331 \*\*\*
5.5.2.3 Measurement Identity Addition/Modification
The network applies the procedure as follows:
    configure a measId only if the corresponding measurement object, the corresponding reporting configuration and the corresponding quantity configuration, are configured.
The UE shall:
  1>for each measId included in the received measIdToAddModList:
    2>if an entry with the matching measId exists in the measIdList within the VarMeasConfig:
      3>replace the entry with the value received for this measId;
    2>else:
      3>add a new entry for this measId within the VarMeasConfig;
    2>remove the measurement reporting entry for this measId from the VarMeasReportList, if included;
    2>stop the periodical reporting timer or timer T321, whichever one is running, and reset the associated information (e.g., timeToTrigger) for this measId;
    2>if the reportType is set to reportCGI in the reportConfig associated with this measId; or
    2>if the reportType is set to reportIABCapability in the reportConfig associated with this measId;
      3>if the measObject associated with this measId concerns E-UTRA:
        4>start timer T321 with the timer value set to 1 second for this measId;
      3>if the measObject associated with this measId concerns NR:
        4>if the measObject associated with this measId concerns FR1:

5>start timer T321 with the timer value set to 2 seconds for this measId;
4>if the measObject associated with this measId concerns FR2:
5>start timer T321 with the timer value set to 16 seconds for this measId.

5.5.4 Measurement Report Triggering
5.5.4.1 General

If AS security has been activated successfully, the UE shall:
1>for each measId included in the measIdList within VarMeasConfig:
2>if the corresponding reportConfig includes a reportType set to eventTriggered or periodical:
3>if the corresponding measObject concerns NR:
4>if the eventA1 or eventA2 is configured in the corresponding reportConfig:
5>consider only the serving cell to be applicable;
4>if the eventA3 or eventA2 is configured in the corresponding reportConfig:
5>if a serving cell is associated with a measObjectNR and neighbours are associated with another measObjectNR, consider any serving cell associated with the other measObjectNR to be a neighbouring cell as well;
4>for measurement events other than eventA1 or eventA2:
5>if useWhiteCellList is set to true:
6>consider any neighbouring cell detected based on parameters in the associated measObjectNR to be applicable when the concerned cell is included in the whiteCellsToAddModList defined within the VarMeasConfig for this measId;
5>else:
6>consider any neighbouring cell detected based on parameters in the associated measObjectNR to be applicable when the concerned cell is not included in the blackCellsToAddModList defined within the VarMeasConfig for this measId;
3>else if the corresponding measObject concerns E-UTRA:
4>consider any neighbouring cell detected on the associated frequency to be applicable when the concerned cell is not included in the blackCellsToAddModListEUTRAN defined within the VarMeasConfig for this measId;
2>else if the corresponding reportConfig includes a reportType set to reportCGI:
3>consider the cell detected on the associated measObject which has a physical cell identity matching the value of the cellForWhichToReportCGI included in the corresponding reportConfig within the VarMeasConfig to be applicable;
2>else if the corresponding reportConfig includes a reportType set to reportIABCapability:
3>consider the cell detected on the associated measObject which has a physical cell identity matching the value of the cellForWhichToReportCapability included in the corresponding reportConfig within the VarMeasConfig to be applicable;
2>if the reportType is set to eventTriggered and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3>include a measurement reporting entry within the VarMeasReportList for this measId;
3>set the numberOfReportsSent defined within the VarMeasReportList for this measId to 0;
3>include the concerned cell(s) in the cellsTriggeredList defined within the VarMeasReportList for this measId;
3>initiate the measurement reporting procedure, as specified in 5.5.5;
2>else if the reportType is set to eventTriggered and if the entry condition applicable for this event, i.e., the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
3>set the numberOfReportsSent defined within the VarMeasReportList for this measId to 0;
3>include the concerned cell(s) in the cellsTriggeredList defined within the VarMeasReportList for this measId;
3>initiate the measurement reporting procedure, as specified in 5.5.5;
2>else if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
3>remove the concerned cell(s) in the cellsTriggeredList defined within the VarMeasReportList for this measId;
3>if reportOnLeave is set to true for the corresponding reporting configuration:
4>initiate the measurement reporting procedure, as specified in 5.5.5;
3>if the cellsTriggeredList defined within the VarMeasReportList for this measId is empty:
4>remove the measurement reporting entry within the VarMeasReportList for this measId;
4>stop the periodical reporting timer for this measId, if running;
2>if reportType is set to periodical and if a (first) measurement result is available:
3>include a measurement reporting entry within the VarMeasReportList for this measId;
3>set the numberOfReportsSent defined within the VarMeasReportList for this measId to 0;
3>if the reportAmount exceeds 1:
4>initiate the measurement reporting procedure, as specified in 5.5.5, immediately after the quantity to be reported becomes available for the NR SpCell;
3>else (i.e., the reportAmount is equal to 1):
4>initiate the measurement reporting procedure, as specified in 5.5.5, immediately after the quantity to be reported becomes available for the NR SpCell and for the strongest cell among the applicable cells;
2>upon expiry of the periodical reporting timer for this measId:
   3>initiate the measurement reporting procedure, as specified in 5.5.5.
2>if reportType is set to reportCGI:
   3>if the UE acquired the SIB1 or SystemInformationBlockType1 for the requested cell; or
   3>if the UE detects that the requested NR cell is not transmitting SIB (see TS 38.213 [13], clause 13):
      4>stop timer T321;
      4>include a measurement reporting entry within the VarMeasReportList for this measId;
      4>set the numberOfReportsSent defined within the VarMeasReportList for this measId to 0;
      4>initiate the measurement reporting procedure, as specified in 5.5.5;
2>if reportType is set to reportIABCapability:
   3>if the UE acquired the SIB1 or SystemInformationBlockType1 for the requested cell; or
   3>if the UE detects that the requested NR cell is not transmitting SIB (see TS 38.213 [13], clause 13):
      4>stop timer T3xx;
      4>include a measurement reporting entry within the VarMeasReportList for this measId;
      4>set the numberOfReportsSent defined within the VarMeasReportList for this measId to 0;
      4>initiate the measurement reporting procedure, as specified in 5.5.5;
2>upon the expiry of T321 for this measId:
   3>include a measurement reporting entry within the VarMeasReportList for this measId;
   3>set the numberOfReportsSent defined within the VarMeasReportList for this measId to 0;
   3>initiate the measurement reporting procedure, as specified in 5.5.5.
* End text for 3GPP TS 38.331 *

In the above procedures, reportCGI and reportIABCapability are alternatives (i.e., both cannot be requested at the same time). However, the above is just an example realization and it should be possible to request both for the same cell at the same time. Alternatively, if the UE is an IAB-MT, whenever it performs CGI reporting, it will implicitly assume it has also to report IAB capability. For example, the first time a cell is detected that is not in the NCRT, both the CGI and IAB capability can be gathered at the same time. This can be an efficient approach if both the CGI and IAB capability are included in SIB1 and the UE (e.g., IAB-MT) does not have to acquire other SIBs to obtain the IAB capability.

These embodiments described above can be further illustrated with reference to FIGS. 13-14, which depict exemplary methods (e.g., procedures) performed by an IAB MT and a CU, respectively. Put differently, various features of the operations described below correspond to various embodiments described above.

Figure 13:
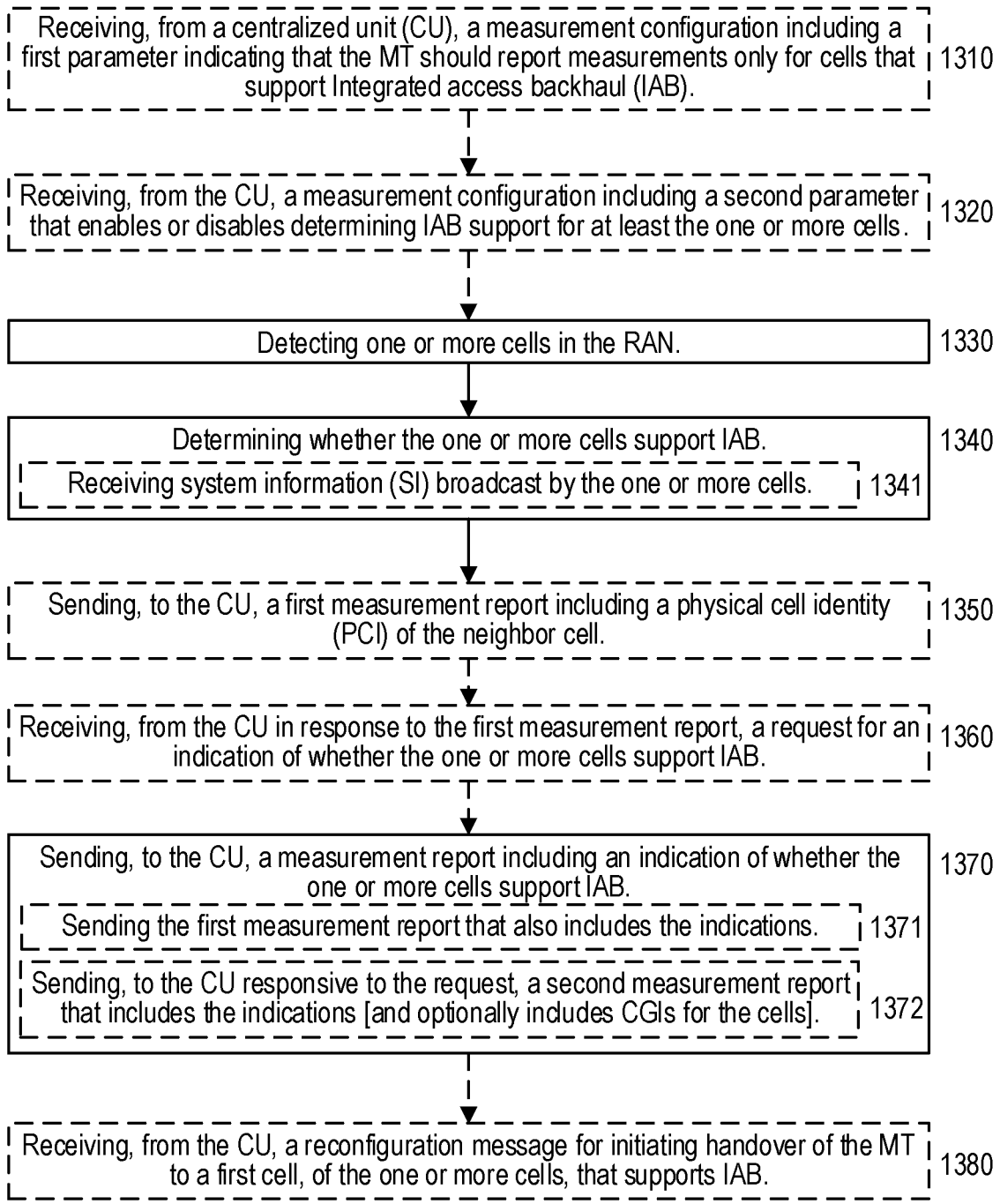
FIG. 13 shows an exemplary method (e.g., procedure) performed by a mobile terminal (MT) of an IAB node, according to various exemplary embodiments of the present disclosure.

More specifically, FIG. 13 illustrates an exemplary method (e.g., procedure) for reporting integrated access backhaul (IAB) capabilities of cells in a radio access network (RAN), according to various exemplary embodiments of the present disclosure. The exemplary method shown in FIG. 13 can be performed by a mobile terminal (MT) of an IAB node in the RAN (e.g., NG-RAN), such as described herein with reference to other figures. Furthermore, the exemplary method shown in FIG. 13 can be complementary to other exemplary methods disclosed herein (e.g., FIG. 14) such that they can be used cooperatively to provide benefits, advantages, and/or solutions to problems described herein. Although the exemplary method is illustrated in FIG. 13 by specific blocks in a particular order, the operations corresponding to the blocks can be performed in different orders than shown and can be combined and/or divided into blocks and/or operations having different functionality than shown. Optional blocks and/or operations are indicated by dashed lines.

The exemplary method can include the operations of block 1330, where the MT can detect one or more cells in the RAN. The exemplary method can also include the operations of block 1340, where the MT can determine whether the one or more cells support IAB. The exemplary method can also include the operations of block 1370, where the MT can send, to a centralized unit (CU, e.g., an IAB-donor CU of a gNB) in the RAN, a measurement report including an indication of whether the one or more cells support IAB.

In some embodiments, the indication for each particular cell of the one or more cells can take on a first value (e.g., "1" or "true") in a first field of the measurement report if the particular cell supports IAB, and a second value (e.g., "0" or "false") in the first field if the particular cell does not support IAB. In other embodiments, the indication for each particular cell of the one or more cells can be a first field in the measurement report if the particular cell supports IAB, but can be absence of the first field (i.e., the first field is excluded) from the measurement report if the particular cell does not support IAB.

In other embodiments, the exemplary method can also include the operations of block 1310, where the MT can receive, from the CU, a measurement configuration including a first parameter indicating that the MT should report measurements only for cells that support IAB. In such embodiments, the indication for each particular cell of the one or more cells includes one or more measurements for the particular cell, if the particular cell supports IAB, and no measurements for the particular cell, if the particular cell does not support IAB.

In some embodiments, the exemplary method can also include the operations of block 1320, where the MT can receive, from the CU, a measurement configuration including a second parameter that enables or disables determining IAB support for at least the one or more cells. In such embodiments the determining operations of block 1340 can be performed conditionally based on the second parameter (e.g., a particular value of the second parameter).

In some embodiments, the exemplary method can also include the operations of block 1350, where the MT can send, to the CU, a first measurement report including respective physical cell identity (PCIS) corresponding to the one or more cells. In some of these embodiments, the "first measurement report" can be the same as "measurement report," such that the operations of block 1350 can be part of the operations of block 1370. In particular, in sub-block 1371, the MT can send the first measurement report (which in this case is the "measurement report") that includes the indications of whether the one or more cells support IAB and the PCIS corresponding to the one or more cells.

In other of these embodiments, the "first measurement report" does not include the IAB support indications. In such embodiments, the exemplary method can also include the operations of block 1360, where the MT can receive, from the CU in response to the first measurement report, a request for an indication of whether the one or more cells support IAB. In such embodiments, the operations of block 1370 can include the operations of sub-block 1372, where the MT can send, to the CU responsive to the request, a second measurement report that includes the indications of whether the one or more cells support IAB. Put differently, in these embodiments, the "second measurement report" is the same as the "measurement report." Furthermore, in some of these embodiments, the second measurement report can include cell global identities (CGI) corresponding to the one or more cells.

In some embodiments, determining whether the one or more cells support IAB in block 1340 can include the operations of block 1341, where the MT can receive system information (SI) broadcast by the one or more cells, where the broadcast SI includes respective indications of whether the one or more cells support IAB.

In some embodiments, the exemplary method can also include the operations of block 1380, where the MT can receive, from the CU, a reconfiguration message for initiating handover of the MT to a first cell, of the one or more cells, that supports IAB. In other words, based on the MT's reporting of the IAB support, the CU can select a particular one of the cells that supports IAB for handover of the MT.

Figure 14A:
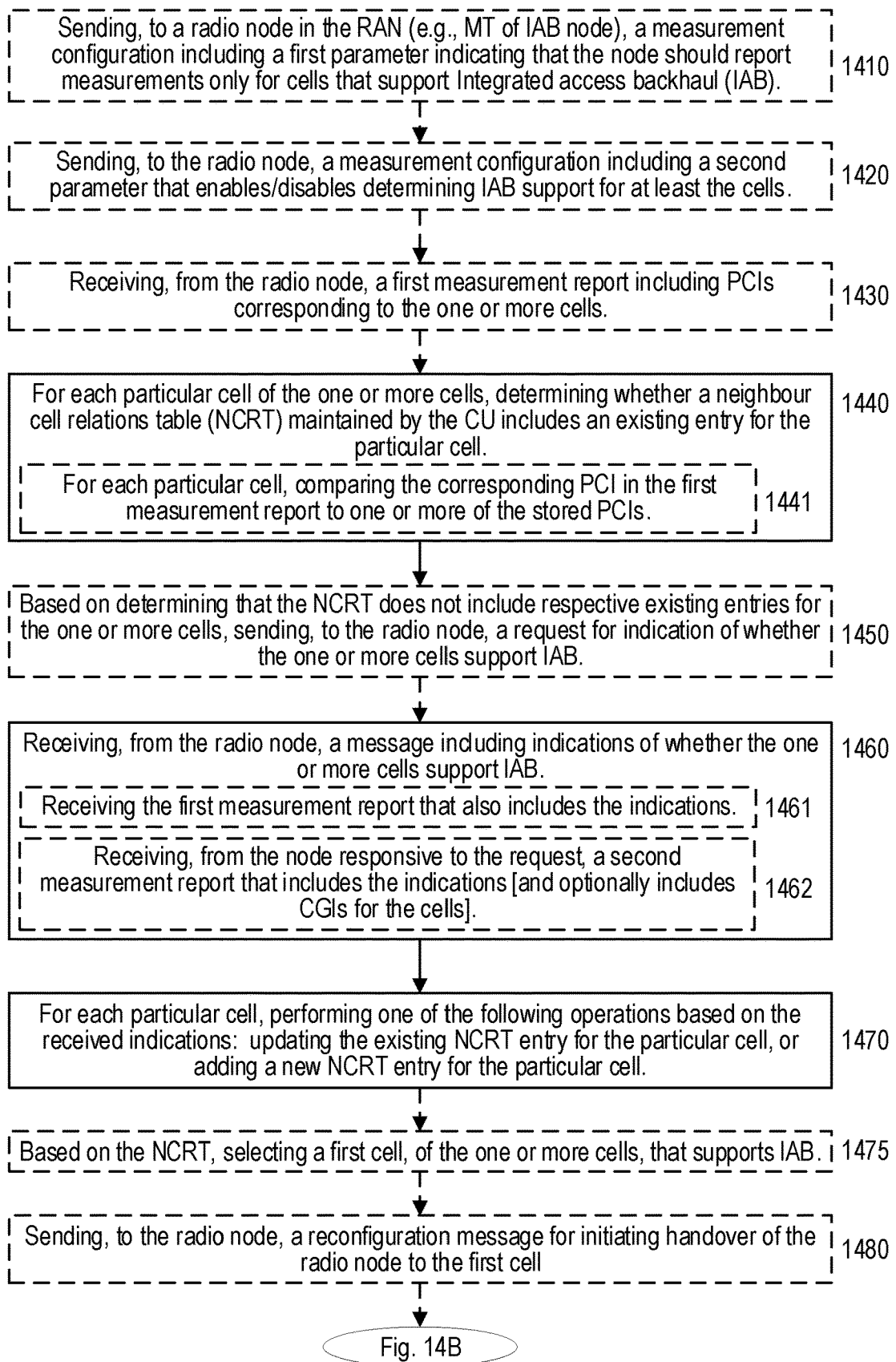
FIGS. 14A-B, shows an exemplary method (e.g., procedure) performed by a CU, according to various exemplary embodiments of the present disclosure.
Figure 14B:
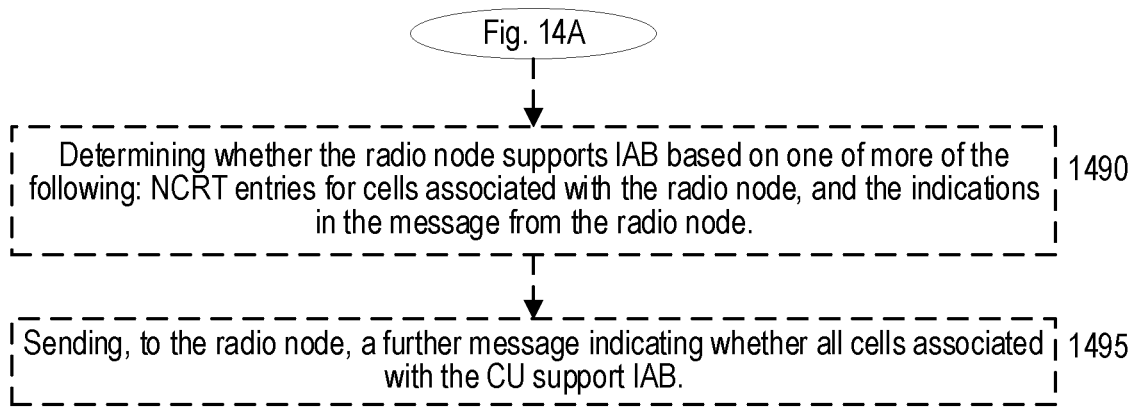

In addition, FIG. 14 (which includes FIGS. 14A-B) illustrates an exemplary method (e.g., procedure) for determining integrated access backhaul (IAB) capabilities of cells in a radio access network (RAN), according to various exemplary embodiments of the present disclosure. The exemplary method shown in FIG. 14 can be performed by a centralized unit (CU, e.g., IAB-donor CU of a gNB) in the RAN (e.g., NG-RAN), such as described herein with reference to other figures. Furthermore, the exemplary method shown in FIG. 14 can be complementary to other exemplary methods disclosed herein (e.g., FIG. 13) such that they can used cooperatively to provide benefits, advantages, and/or solutions to problems described herein. Although the exemplary method is illustrated in FIG. 14 by specific blocks in a particular order, the operations corresponding to the blocks can be performed in different orders than shown and can be combined and/or divided into blocks and/or operations having different functionality than shown. Optional blocks and/or operations are indicated by dashed lines.

The exemplary method can include the operations of block 1460, where the CU can receive, from a radio node in the RAN, a message that includes indications of whether one or more cells in the RAN support integrated access backhaul (IAB). In various embodiments, the radio node can be an MT of an IAB node or another CU. The exemplary method can also include the operations of block 1440, where the CU can, for each particular cell of the one or more cells, determine whether a neighbour cell relations table (NCRT) maintained by the CU includes an existing entry for the particular cell. The exemplary method can also include the operations of block 1470, where the CU can, for each particular cell, perform one of the following operations based on the received indications: updating an existing NCRT entry for the particular, or adding a new NCRT entry for the particular cell. In some embodiments, each existing or new NCRT entry can include a field indicating whether the particular cell supports IAB.

In some embodiments, the indication for each particular cell can take on a first value (e.g., "1" or "true") in a first field of the measurement report if the particular cell supports IAB, and a second value (e.g., "0" or "false") in the first field if the particular cell does not support IAB. In other embodiments, the indication for each particular cell can be a first field in the measurement report if the particular cell supports IAB, or the absence of the first field (i.e., the first field is excluded) from the measurement report if the particular cell does not support IAB.

In other embodiments, the exemplary method can also include the operations of block 1410, where the CU can send, to the radio node, a measurement configuration including a first parameter indicating that the radio node should report measurements only for cells that support IAB. In such embodiments, the indication for each particular cell of the one or more cells includes one or more measurements for the particular cell, if the particular cell supports IAB, and no measurements for the particular cell, if the particular cell does not support IAB.

In some embodiments, the node in the RAN can be a mobile terminal (MT) of an IAB node. In such embodiments, the exemplary method can also include the operations of block 1420, where the CU can send, to the radio node (e.g., the MT), a measurement configuration including a second parameter that enables or disables determining IAB support for at least the one or more cells.

In some embodiments, each existing NCRT entry includes a stored physical cell identity (PCI). In such embodiments, the exemplary method can also include the operations of block 1430, where the CU can receive, from the radio node (e.g., an MT), a first measurement report including respective PCIs corresponding to the one or more cells. In such embodiments, the determining operations of block 1440 can include the operations of sub-block 1441, where, the CU can compare the corresponding PCI for each particular cell in the first measurement report to one or more of the stored PCIs (i.e., in the NCRT).

In some of these embodiments, the "first measurement report" can be the same as "message" received in block 1460, such that the operations of block 1430 can be part of the operations of block 1460. In particular, in sub-block 1461, the CU can receive the first measurement report (which in this case is the "message") that includes the indications of whether the one or more cells support IAB and the PCIs corresponding to the one or more cells.

In other of these embodiments, the first measurement report may not include the IAB support indications. In such embodiments, the exemplary method can also include the operations of block 1450, where the CU can send, to the radio node (e.g., the MT), a request for an indication of whether the one or more cells support IAB. This request can be based on determining (e.g., in block 1440) that the NCRT does not include respective existing entries for the one or more cells. In such embodiments, the operations of block 1460 can include the operations of sub-block 1462, where the CU can receive, from the radio node (e.g., MT) responsive to the request, a second measurement report that includes the indications of whether the one or more cells support IAB. Put differently, in these embodiments, the "second measurement report" is the same as the "message." Furthermore, in some of these embodiments, the second measurement report can include cell global identities (CGI) corresponding to the one or more cells.

In some embodiments, the exemplary method can also include the operations of blocks 1475-1480. In block 1475, the CU can, based on the NCRT, select a first cell, of the one or more cells, that supports IAB. In block 1480, the CU can send, to the radio node (e.g., the MT), a reconfiguration message for initiating handover of the node to the first cell. In other words, based on the MT's reporting of the IAB support, the CU can select a particular one of the cells that supports IAB for handover of the radio node.

In some embodiments, the radio node can be a second CU (i.e., different from the CU performing the method). In such embodiments, the message (e.g., received in block 1460) can include a single indication of whether all cells associated with the second CU support IAB. Furthermore, in such embodiments, the exemplary method can include the operations of block 1495, where the CU can send, to the radio node (e.g., the second CU), a further message indicating whether all cells associated with the CU support IAB. In various embodiments, the further message can be sent in response to the message received from the radio node (e.g., in block 1460), or sent prior to receiving the message from the radio node (e.g., such that the message is responsive to the further message).

In some embodiments, the exemplary method can also include the operations of block 1490, where the CU can determine whether the radio node supports IAB based on NCRT entries for cells associated with the radio node and/or the indications in the message from the radio node. In such embodiments, sending the further message (e.g., in block 1495) can be based on determining that the radio node supports IAB. In some embodiments, the further message can also include resource allocation for one or more distributed units (DUs) associated with the CU (e.g., for CLI management with the second CU).

Figure 15:
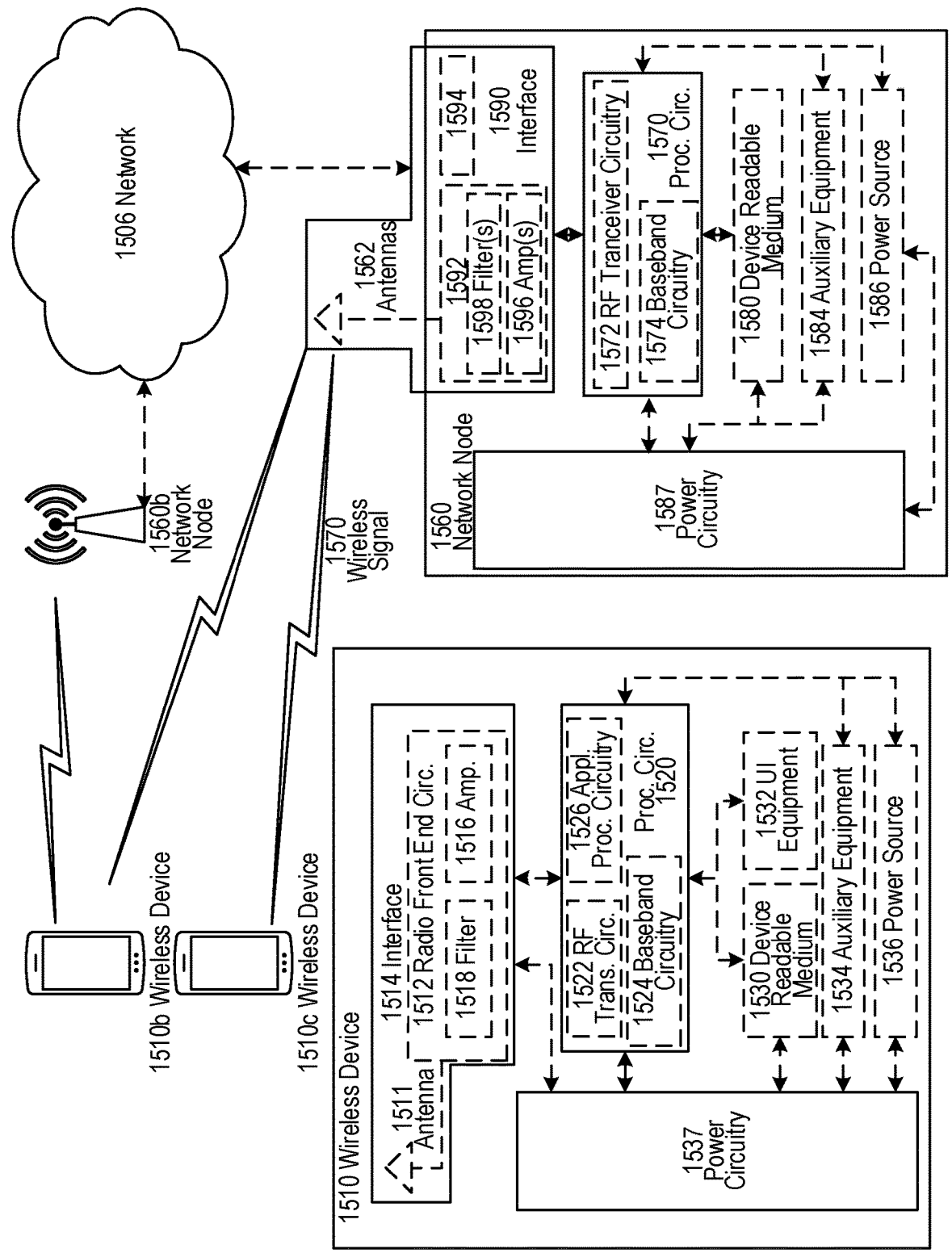
FIG. 15 shows an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and an RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1560, either alone or in conjunction with other network node 1560 components (e.g., device readable medium 1580). Such functionality can include any of the various wireless features, functions, or benefits discussed herein.

For example, processing circuitry 1570 can execute instructions stored in device readable medium 1580 or in memory within processing circuitry 1570. In some embodiments, processing circuitry 1570 can include a system on a chip (SOC). As a more specific example, instructions (also referred to as a computer program product) stored in medium 1580 can include instructions that, when executed by processing circuitry 1570, can configure network node 1560 to perform operations corresponding to various exemplary methods (e.g., procedures) described herein.

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1510 functionality either alone or in combination with other WD 1510 components, such as device readable medium 1530. Such functionality can include any of the various wireless features or benefits discussed herein.

For example, processing circuitry 1520 can execute instructions stored in device readable medium 1530 or in memory within processing circuitry 1520 to provide the functionality disclosed herein. More specifically, instructions (also referred to as a computer program product) stored in medium 1530 can include instructions that, when executed by processor 1520, can configure wireless device 1510 to perform operations corresponding to various exemplary methods (e.g., procedures) described herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510 and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
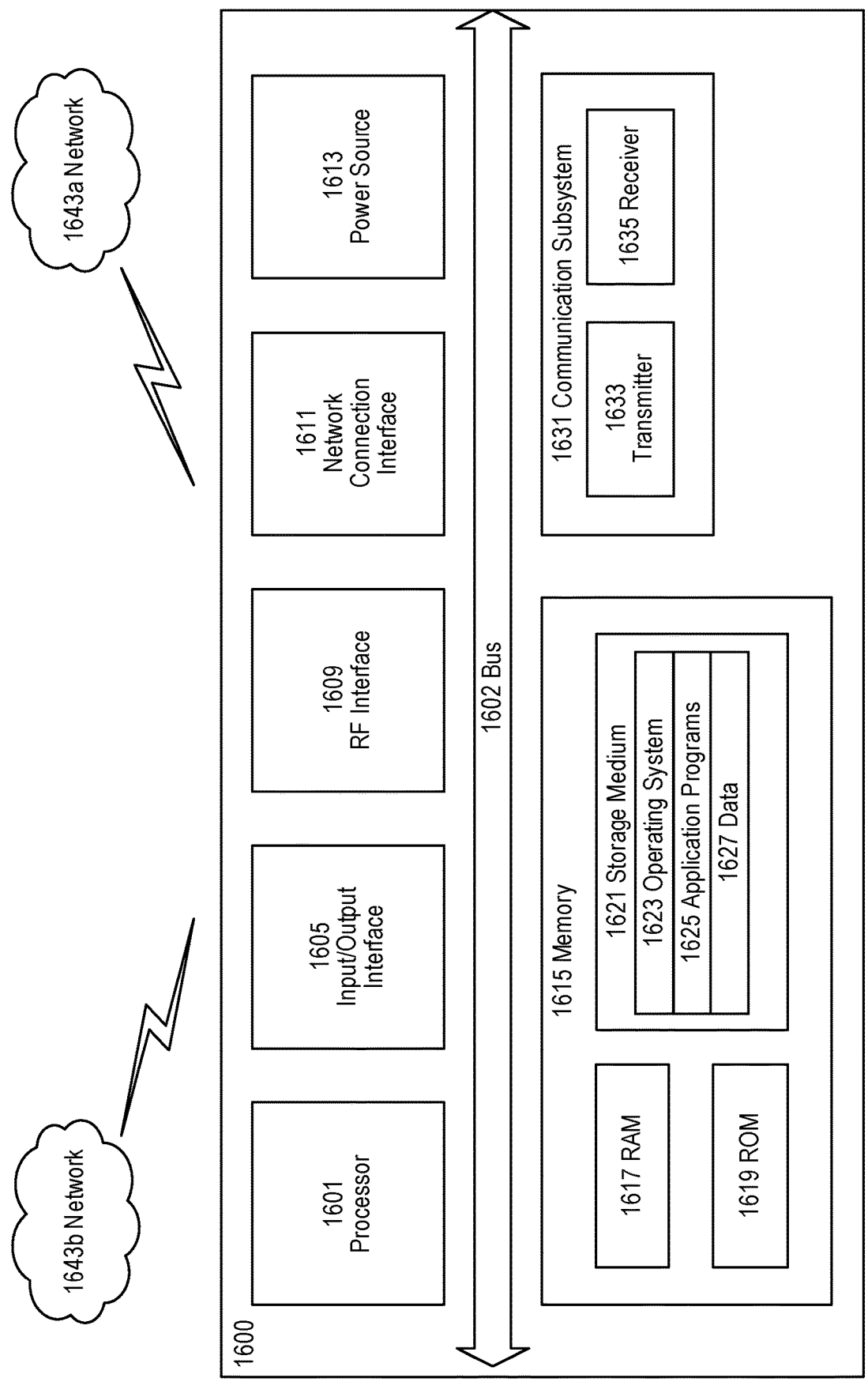
FIG. 16 shows an exemplary embodiment of a UE, in accordance with various aspects described herein.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 16200 can be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643*a*. Network 1643*a* can encompass wired and/or wireless networks such as a local-area network (LAN), a wide-area network (WAN), a computer network, a wireless network, a telecommunications network, another like network or any combination thereof. For example, network 1643*a* can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1621 can be configured to include operating system 1623; application program 1625 such as a web browser application, a widget or gadget engine or another application; and data file 1627. Storage medium 1621 can store, for use by UE 1600, any of a variety of various operating systems or combinations of operating systems. For example, application program 1625 can include executable program instructions (also referred to as a computer program product) that, when executed by processor 1601, can configure UE 1600 to perform operations corresponding to various exemplary methods (e.g., procedures) described herein.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643*b* using communication subsystem 1631. Network 1643*a* and network 1643*b* can be the same network or networks or different network or networks. Communication subsystem 1631 can be configured to include one or more transceivers used to communicate with network 1643*b*. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643*b* can encompass wired and/or wireless networks such as a local-area network (LAN), a wide-area network (WAN), a computer network, a wireless network, a telecommunications network, another like network or any combination thereof. For example, network 1643*b* can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
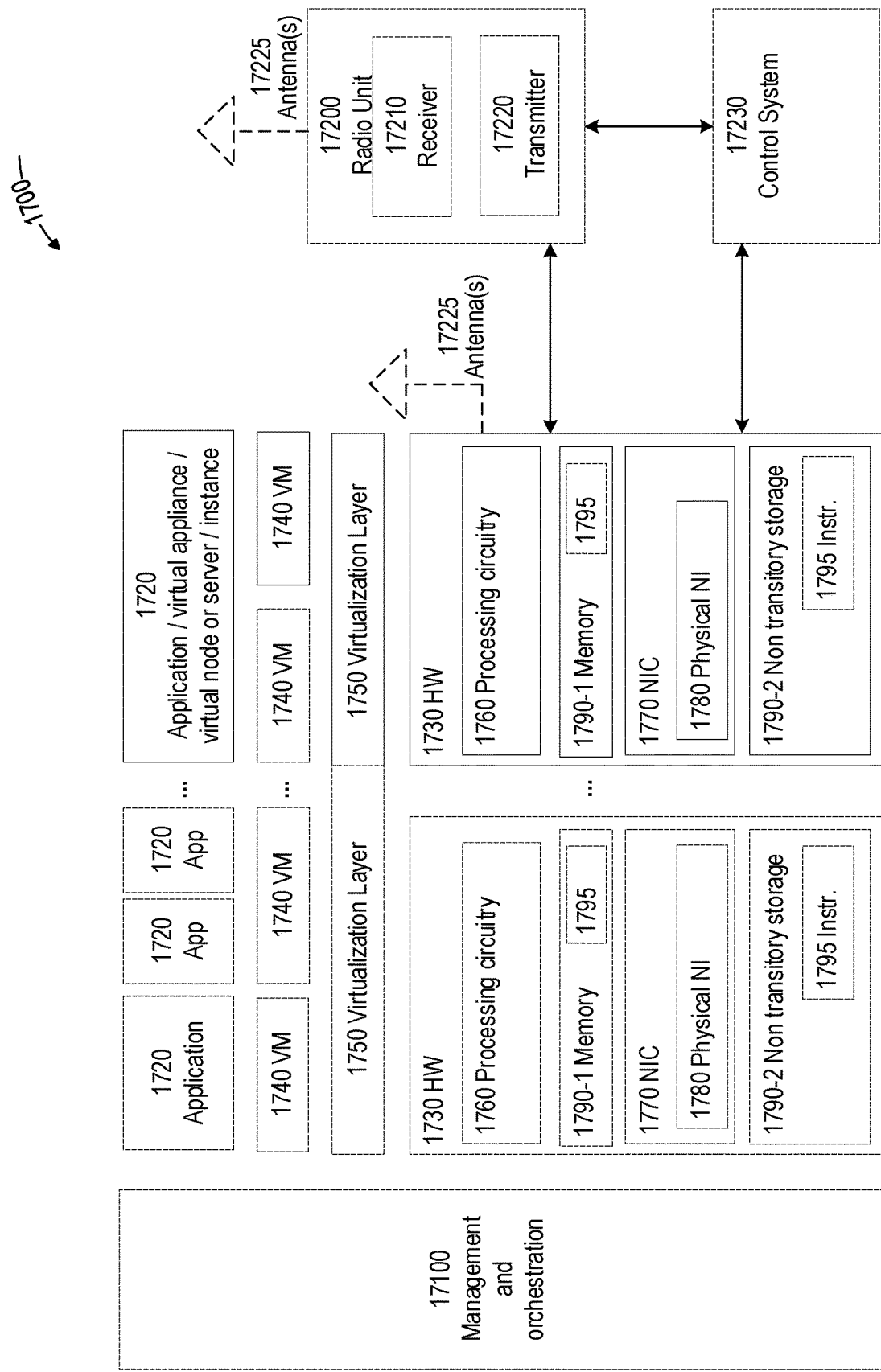
FIG. 17 is a block diagram illustrating an exemplary virtualization environment usable for implementation of various embodiments of network nodes described herein.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700 can include general-purpose or special-purpose network hardware devices (or nodes) 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. For example, instructions 1795 can include program instructions (also referred to as a computer program product) that, when executed by processing circuitry 1760, can configure hardware node 1720 to perform operations corresponding to various exemplary methods (e.g., procedures) described herein. Such operations can also be attributed to virtual node(s) 1720 that is/are hosted by hardware node 1730.

Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 17230, which can alternatively be used for communication between the hardware nodes 1730 and radio units 17200.

Figure 18:
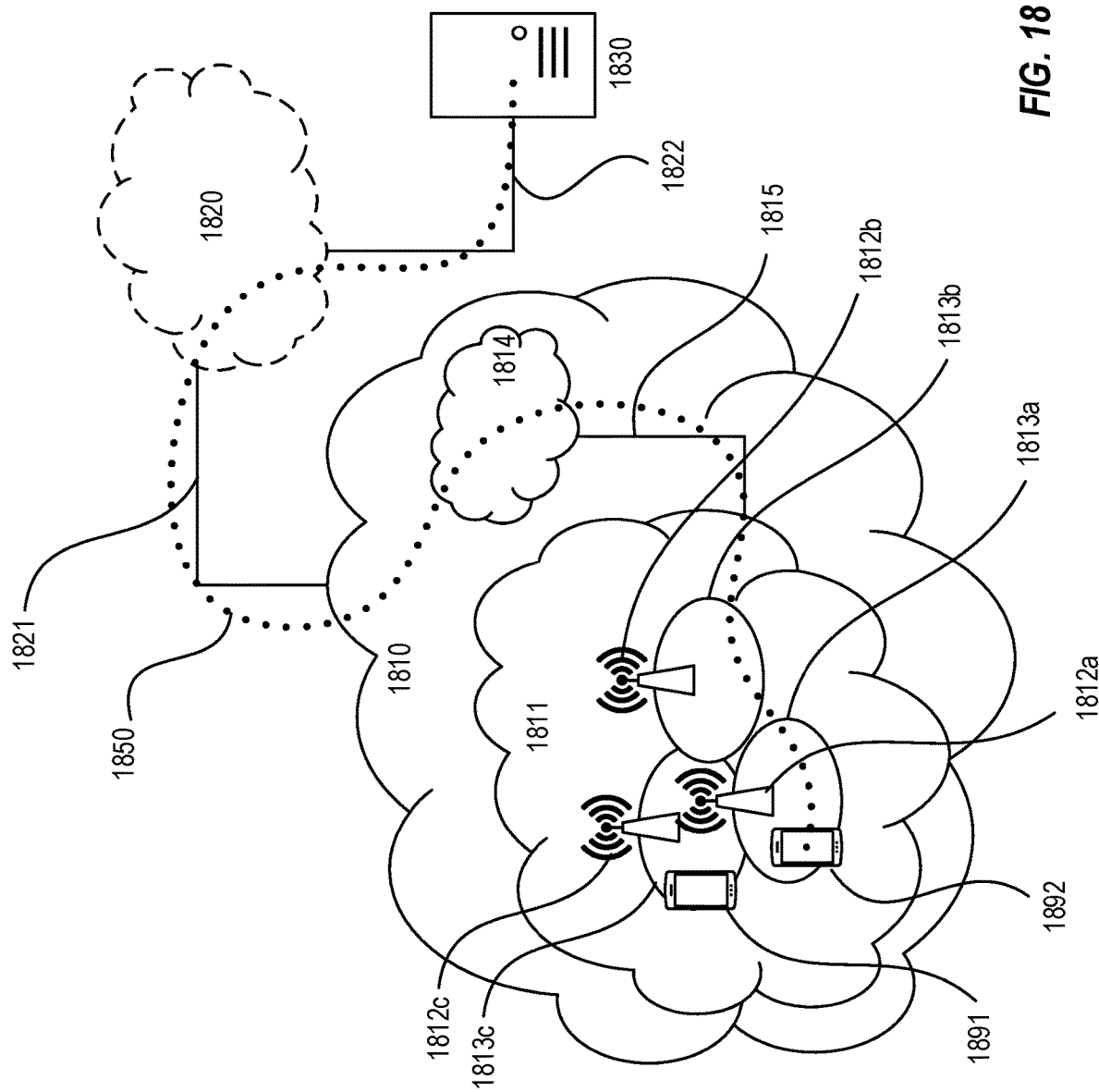
FIGS. 18-19 are block diagrams of various exemplary communication systems and/or networks, in accordance with various aspects described herein.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* can be configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820 can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct, or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions.

Base station 1920 also includes software 1921 stored internally or accessible via an external connection. For example, software 1921 can include program instructions (also referred to as a computer program product) that, when executed by processing circuitry 1928, can configure base station 1920 to perform operations corresponding to various exemplary methods (e.g., procedures) described herein.

Communication system 1900 can also include UE 1930 already referred to, whose hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions.

UE 1930 also includes software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides. Software 1931 can also include program instructions (also referred to as a computer program product) that, when executed by processing circuitry 1938, can configure UE 1930 to perform operations corresponding to various exemplary methods (e.g., procedures) described herein.

Figure 19:
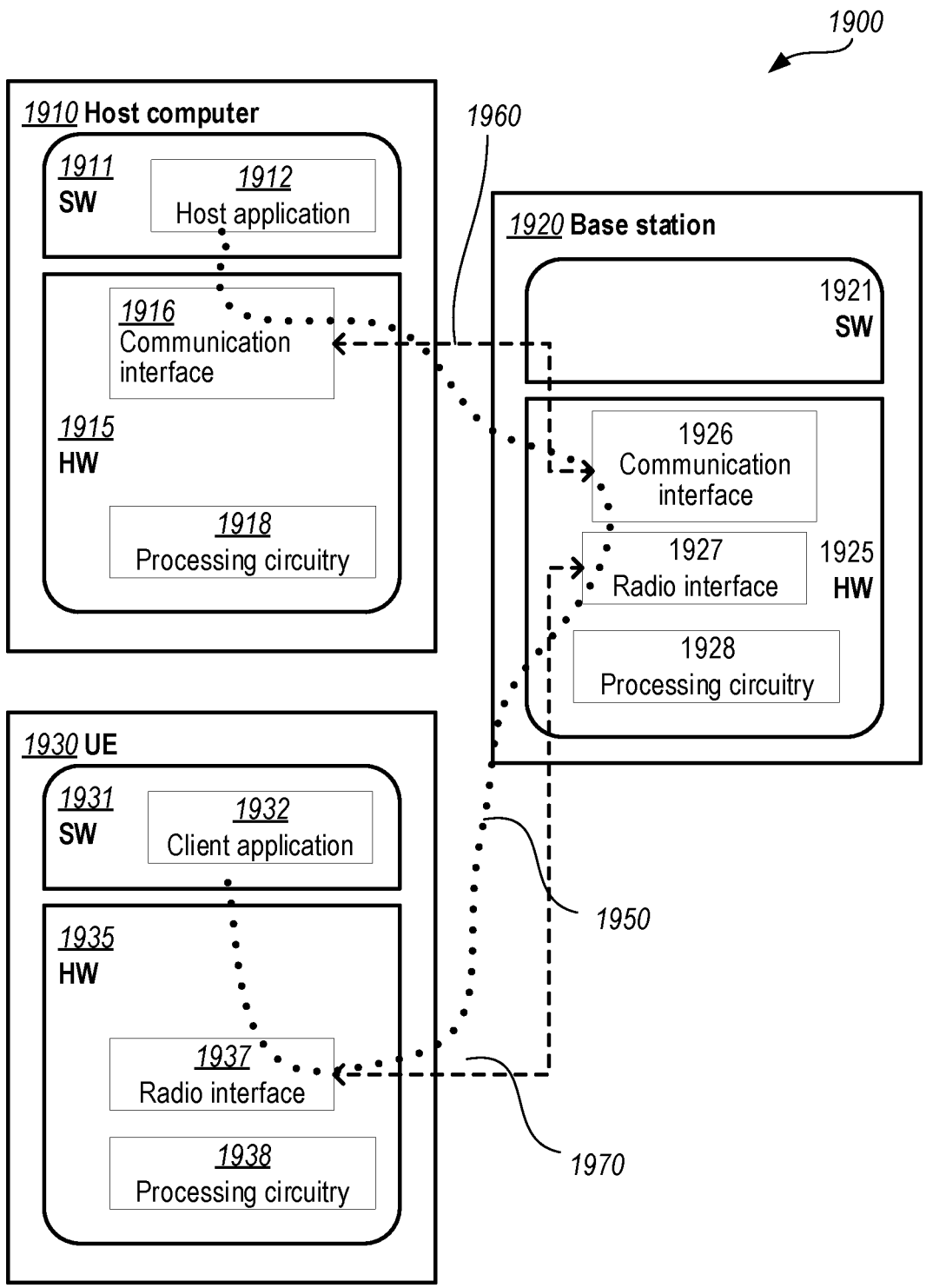

As an example, host computer 1910, base station 1920 and UE 1930 illustrated in FIG. 19 can be similar or identical to host computer 1230, one of base stations 1812a, 1812b, 1812c and one of UEs 1891, 1892 of FIG. 18, respectively. This is to say, the inner workings of these entities can be as shown in FIG. 19 and independently, the surrounding network topology can be that of FIG. 16.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes; the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors, etc.

Figure 20:
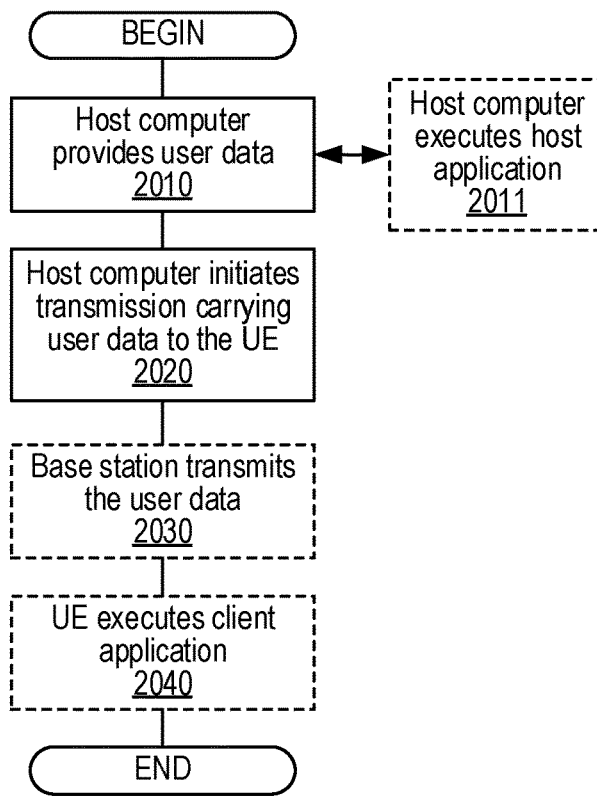
FIGS. 20-23 are flow diagrams of exemplary methods and/or procedures for transmission and/or reception of user data.

FIG. 20 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 20 will be included in this section. In step 2010, the host computer provides user data. In substep 2011 (which can be optional) of step 2010, the host computer provides the user data by executing a host application. In step 2020, the host computer initiates a transmission carrying the user data to the UE. In step 2030 (which can be optional), the base station transmits to the UE the user data which was carried in the transmission that the host computer initiated, in accordance with the teachings of the embodiments described throughout this disclosure. In step 2040 (which can also be optional), the UE executes a client application associated with the host application executed by the host computer.

Figure 21:
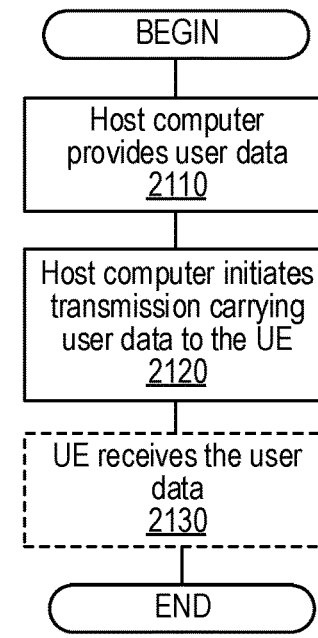

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 of the method, the host computer provides user data. In an optional sub step (not shown) the host computer provides the user data by executing a host application. In step 2120, the host computer initiates a transmission carrying the user data to the UE. The transmission can pass via the base station, in accordance with the teachings of the embodiments described throughout this disclosure. In step 2130 (which can be optional), the UE receives the user data carried in the transmission.

Figure 22:
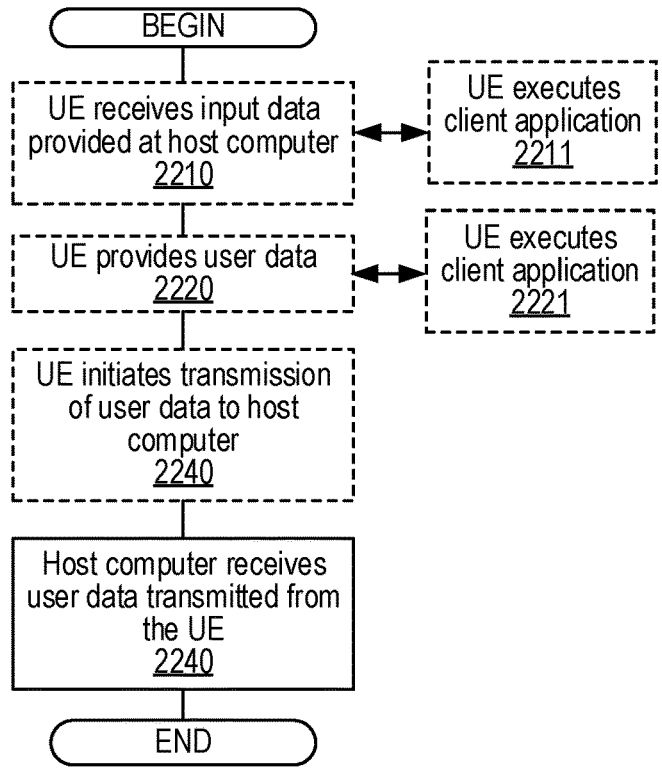

FIG. 22 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 22 will be included in this section. In step 2210 (which can be optional), the UE receives input data provided by the host computer. Additionally or alternatively, in step 2220, the UE provides user data. In substep 2221 (which can be optional) of step 2220, the UE provides the user data by executing a client application. In substep 2211 (which can be optional) of step 2210, the UE executes a client application which provides the user data in reaction to the received input data provided by the host computer. In providing the user data, the executed client application can further consider user input received from the user. Regardless of the specific manner in which the user data was provided, the UE initiates, in substep 2230 (which can be optional), transmission of the user data to the host computer. In step 2240 of the method, the host computer receives the user data transmitted from the UE, in accordance with the teachings of the embodiments described throughout this disclosure.

Figure 23:
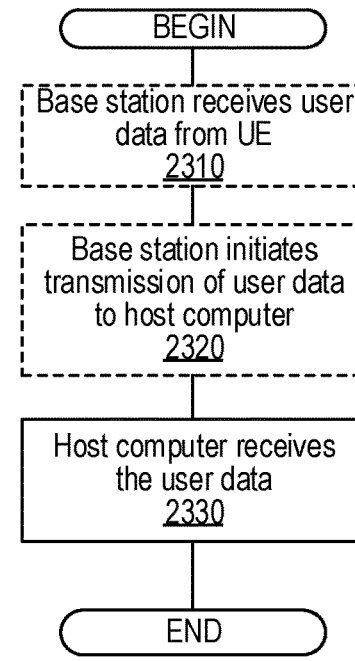

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 (which can be optional), in accordance with the teachings of the embodiments described throughout this disclosure, the base station receives user data from the UE. In step 2320 (which can be optional), the base station initiates transmission of the received user data to the host computer. In step 2330 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

E1. A method for reporting integrated access backhaul (IAB) capabilities of cells in a radio access network (RAN), the method performed by a mobile terminal (MT) of an IAB node, the method comprising:
  detecting a neighbor cell;
  determining whether the neighbor cell supports IAB; and
  sending a measurement report to a centralized unit (CU) in the RAN, the measurement report including an indication of whether the neighbor cell supports IAB.

E2. The method of embodiment E1, further comprising receiving, from the CU, a measurement configuration relating to the neighbour cell.

E3. The method of embodiment 2, wherein:
  the measurement configuration includes a first parameter that enables or disables determining IAB support of at least the neighbor cell; and
  determining whether the neighbor cell supports IAB is conditional upon the value of the first parameter.

E4. The method of any of embodiments E1-E3, further comprising:
  sending a first measurement report to the CU, wherein the first measurement report includes a physical cell identity (PCI) of the neighbour cell; and
  receiving, from the CU, a request for an indication of whether the neighbor cell supports IAB,
  wherein the measurement report including the indication of whether the neighbor cell supports IAB is sent in response to the request.

E5. The method of embodiment E4, wherein the measurement report also includes a cell global identity (CGI) of the neighbour cell.

E6. The method of any of embodiments E1-E5, wherein the indication comprises:
  a first value if the neighbour cell supports IAB; and
  a second value if the neighbour cell does not support IAB.

E7. The method of any of embodiments E1-E5, wherein:
  the indication is included in the measurement report if the neighbour cell supports IAB; and
  the indication is excluded from the measurement report if the neighbour cell does not support IAB.

E8. The method of any of embodiments E1-E7, wherein determining whether the neighbor cell supports IAB comprises receiving system information (SI) broadcast by the neighbour cell, wherein the SI includes the indication of whether the neighbour cell supports IAB.

E9. A method for determining integrated access backhaul (IAB) capabilities of cells in a radio access network (RAN), the method performed by a centralized unit (CU) in the RAN, the method comprising:
  receiving, from a node in the RAN, a message that includes indications of whether one or more cells in the RAN support IAB;
  for each of the one or more cells, determining whether a corresponding entry exists in a neighbour cell relations table (NCRT) maintained by the CU;
  for each of the one or more cells, performing one of the following operations based on the received indications: updating an existing NCRT entry, or adding a new entry to the NCRT.

E10. The method of embodiment E9, wherein the node is a mobile terminal (MT) of an IAB node.

E11. The method of embodiment E10, further comprising sending, to the MT, a measurement configuration relating to the one or more cells, wherein the measurement configuration includes a first parameter that enables or disables determining IAB support of the one or more cells.

E12. The method of any of embodiments E10-E11, wherein:
  the method further comprises receiving a first measurement report from the MT, wherein the first measurement report includes a physical cell identity (PCI) for each of the one or more cells;
  each existing NCRT entry includes a stored PCI; and
  determining whether the corresponding NCRT entry exists for each of the cells comprises comparing the received PCIs to the stored PCIs.

E13. The method of embodiment E12, wherein the first measurement report also includes the indications of whether the one or more cells in the RAN support IAB.

E14. The method of embodiment E12, wherein:
  the method further comprises, based on determining that corresponding NCRT entries do not exist, sending, to the MT, a request for indication of whether the one or more cells support IAB; and
  the message is a second measurement report received from the MT in response to the request.

E15. The method of embodiment E14, wherein the second measurement report also includes cell global identities (CGI) of the one or more cells.

E16. The method of any of embodiments E9-E15, wherein the indication for each of the one or more cells comprises:
  a first value if the cell supports IAB; and
  a second value if the cell does not support IAB.

E17. The method of any of embodiments E9-E15, wherein:
  the indication is included in the message if the neighbour cell supports IAB; and
  the indication is excluded from the message report if the neighbour cell does not support IAB.

E18. The method of embodiment E9, wherein:
  the node is a second CU; and
  the message includes a single indication of whether all cells associated with the second CU support IAB.

E19. The method of embodiment E18, further comprising sending, to the second CU, a further message indicating whether all cells associated with the CU support IAB, wherein the further message is sent according to one of the following:
  in response to the message from the second CU, or
  prior to receiving the message from the CU.

E20. A mobile terminal (MT) of an integrated access backhaul (IAB) node in a radio access network (RAN), the MT comprising:
  radio interface circuitry configured to communicate via one or more cells in the RAN; and
  processing circuitry operably coupled to the radio interface circuitry, whereby the processing circuitry and radio interface circuitry are configured to perform operations corresponding to any of the methods of embodiments E1-E8.

E21. A non-transitory, computer-readable medium storing computer-executable instructions that, when executed by processing circuitry of a mobile terminal (MT) of an integrated access backhaul (IAB) node, configure the MT to perform operations corresponding to any of the methods of embodiments E1-E8.

E22. A centralized unit (CU) of a radio access network (RAN) that includes one or more of integrated access backhaul (IAB) nodes, the CU comprising:
  interface circuitry configured to communicate with the IAB nodes; and
  processing circuitry operably coupled to the interface circuitry, whereby the processing circuitry and interface circuitry are configured to perform operations corresponding to any of the methods of embodiments E9-E19.

E23. A non-transitory, computer-readable medium storing computer-executable instructions that, when executed by processing circuitry of a centralized unit (CU) of a radio access network (RAN), configure the CU to perform operations corresponding to any of the methods of embodiments E9-E19.

The invention claimed is:

1. A method performed by a mobile terminal (MT) of an integrated access backhaul (IAB) node in a radio access network (RAN), wherein the method comprises:
  receiving, from an IAB donor centralized unit (CU) in the RAN, a measurement configuration including a first parameter indicating that the MT should report measurements only for cells that support IAB;
  detecting one or more cells in the RAN, wherein the one or more cells are served by a neighbor CU to the IAB donor CU;
  determining whether the one or more cells support IAB; and
  sending, to the IAB donor CU, a measurement report including an indication of whether the one or more cells support IAB, wherein based on the first parameter the indication for each particular cell of the one or more cells comprises:
    one or more measurements for the particular cell, when the particular cell supports IAB; and
    no measurements for the particular cell, when the particular cell does not support IAB.

2. The method of claim 1, wherein the indication for each particular cell of the one or more cells comprises:
  a first field in the measurement report when the particular cell supports IAB; and
  absence of the first field in the measurement report when the particular cell does not support IAB.

3. The method of claim 1, wherein:
  the measurement configuration also includes a second parameter that enables or disables determining IAB support for at least the one or more cells; and
  determining whether the one or more cells support IAB is performed conditionally based on the second parameter.

4. The method of claim 1, further comprising sending, to the IAB donor CU, a first measurement report including respective physical cell identities (PCIs) corresponding to the one or more cells.

5. The method of claim 1, wherein:
  determining whether the one or more cells supports IAB comprises receiving system information (SI) broadcast by the one or more cells; and
  the SI broadcast by the one or more cells includes respective indications of whether the one or more cells support IAB.

6. The method of claim 1, further comprising receiving, from the IAB donor CU, a reconfiguration message for initiating handover of the MT to a first cell, of the one or more cells, that supports IAB.

7. A method performed by an integrated access backhaul (IAB) donor centralized unit (CU) in in a radio access network (RAN), wherein the method comprises:

sending, to a mobile terminal (MT) of an IAB node in the RAN, a measurement configuration including a first parameter indicating that the MT should report measurements only for cells that support IAB;

receiving, from the MT, a message including indications of whether one or more cells detected by the MT support IAB, wherein the one or more cells are served by a neighbor CU to the IAB donor CU and wherein based on the first parameter the indication for each particular cell in the message comprises:
one or more measurements for the particular cell, when the particular cell supports IAB; and
no measurements for the particular cell, when the particular cell does not support IAB;

for each particular cell of the one or more cells, determining whether a neighbor cell relations table (NCRT) maintained by the LAB donor CU includes an existing entry for the particular cell; and for each particular cell, performing one of the following operations based on the received indications:
updating the existing NCRT entry for the particular cell, or
adding a new NCRT entry for the particular cell.

8. The method of claim 7, wherein each existing or new NCRT entry includes a field indicating whether the particular cell supports IAB.

9. The method of claim 7, wherein the indication for each particular cell in the message comprises:
a first field in the message if the particular cell supports IAB; and
absence of the first field in the message if the particular cell does not support IAB.

10. A mobile terminal (MT) of an integrated access backhaul (IAB) node for a radio access network (RAN), the MT comprising:
radio interface circuitry configured to communicate with an IAB donor centralized unit (CU) in the RAN; and
processing circuitry operably coupled to the radio interface circuitry, whereby the processing circuitry and the radio interface circuitry are configured to:
receive, from the IAB donor CU, a measurement configuration including a first parameter indicating that the MT should report measurements only for cells that support IAB;
detect one or more cells in the RAN, wherein the one or more cells are served by a neighbor CU to the IAB donor CU;
determine whether the one or more cells support IAB; and
send, to the LAB donor CU, a measurement report including an indication of whether the one or more cells support IAB, wherein based on the first parameter the indication for each particular cell of the one or more cells comprises:
one or more measurements for the particular cell, if the particular cell supports IAB; and
no measurements for the particular cell, if the particular cell does not support IAB.

11. The mobile terminal (MT) of claim 10, wherein
the indication for each particular cell of the one or more cells comprises a first field in the measurement report when the particular cell supports IAB and absence of the first field in the measurement report when the particular cell does not support IAB.

12. An integrated access backhaul (IAB) donor centralized unit (CU) configured to operate in a radio access network (RAN), the IAB donor CU comprising:
communication interface circuitry configured to communicate with a a mobile terminal (MT) of an IAB node in the RAN; and
processing circuitry operably coupled with the communication interface circuitry, whereby the processing circuitry and the communication interface circuitry are configured to perform operations corresponding to the method of claim 7.

13. The LAB donor centralized unit (CU) of claim 12, wherein
the indication for each particular cell in the message comprises a first field in the measurement report when the particular cell supports IAB and absence of the first field in the measurement report when the particular cell does not support IAB.

* * * * *